(12) United States Patent
Tsukamoto

(10) Patent No.: US 10,619,248 B2
(45) Date of Patent: Apr. 14, 2020

(54) CONDUCTIVE LAMINATE FOR TOUCH PANEL, TOUCH PANEL, AND TRANSPARENT CONDUCTIVE LAMINATE

(71) Applicant: FUJIFILM CORPORATION, Tokyo (JP)

(72) Inventor: Naoki Tsukamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 409 days.

(21) Appl. No.: 15/354,192

(22) Filed: Nov. 17, 2016

(65) Prior Publication Data

US 2017/0067165 A1 Mar. 9, 2017

Related U.S. Application Data

(63) Continuation of application No. PCT/JP2015/066608, filed on Jun. 9, 2015.

(30) Foreign Application Priority Data

Jun. 10, 2014 (JP) .................................. 2014-119694
Feb. 18, 2015 (JP) .................................. 2015-029838

(51) Int. Cl.
  *C23C 18/30* (2006.01)
  *G06F 3/041* (2006.01)
  (Continued)

(52) U.S. Cl.
  CPC .......... *C23C 18/30* (2013.01); *C03C 17/3405* (2013.01); *C03C 17/38* (2013.01);
  (Continued)

(58) Field of Classification Search
  CPC ..................................................... C03C 17/38
  See application file for complete search history.

(56) References Cited

U.S. PATENT DOCUMENTS

2005/0214550 A1 9/2005 Kawamura
2010/0080893 A1 4/2010 Inoue et al.
(Continued)

FOREIGN PATENT DOCUMENTS

JP    H11-170421 A    6/1999

OTHER PUBLICATIONS

An Office Action issued by the European Patent Office dated Apr. 3, 2019, which corresponds to EP15806466.7-1103 and is related to U.S. Appl. No. 15/354,192.

(Continued)

*Primary Examiner* — Ian A Rummel
(74) *Attorney, Agent, or Firm* — Studebaker & Brackett PC

(57) ABSTRACT

The present invention provides a conductive laminate for a touch panel which includes a substrate, and a patterned metal layer which is visually recognized to have greater blackness when viewed from the substrate side; a touch panel; and a transparent conductive laminate. The conductive laminate includes a substrate which has two main surfaces; a patterned plated layer which is disposed on at least one main surface of the substrate and has a functional group that interacts with metal ions; and a patterned metal layer which is disposed on the patterned plated layer, in which the patterned plated layer includes a metal component constituting the patterned metal layer and the ratio of the average peak intensity resulting from the metal component contained in the patterned plated layer to the average peak intensity resulting from the metal component constituting the patterned metal layer is in a range of 0.5 to 0.95.

12 Claims, 4 Drawing Sheets

(51) Int. Cl.
*C23F 1/18* (2006.01)
*H01B 5/14* (2006.01)
*C23C 18/31* (2006.01)
*C23C 18/38* (2006.01)
*C23C 18/54* (2006.01)
*C03C 17/38* (2006.01)
*C03C 17/34* (2006.01)
*C23C 18/20* (2006.01)
*C23C 18/16* (2006.01)
*C23C 18/40* (2006.01)
*G06F 3/044* (2006.01)

(52) U.S. Cl.
CPC ............. *C23C 18/31* (2013.01); *C23C 18/38* (2013.01); *C23C 18/54* (2013.01); *C23F 1/18* (2013.01); *G06F 3/041* (2013.01); *H01B 5/14* (2013.01); *C03C 2217/948* (2013.01); *C03C 2218/116* (2013.01); *C03C 2218/328* (2013.01); *C03C 2218/34* (2013.01); *C23C 18/1605* (2013.01); *C23C 18/166* (2013.01); *C23C 18/208* (2013.01); *C23C 18/40* (2013.01); *G06F 3/044* (2013.01); *G06F 2203/04103* (2013.01)

(56) References Cited

U.S. PATENT DOCUMENTS

2010/0224317 A1  9/2010  Kawamura
2012/0118614 A1* 5/2012  Kuriki ................... G06F 3/044
                                                          174/250

OTHER PUBLICATIONS

Extended European Search Report (EESR) dated May 23, 2017 from corresponding EP Appl No. 15806466.7, 9 pp.
An Office Action mailed by the State Intellectual Property Office of People's Republic of China dated Jan. 28, 2019, which corresponds to Chinese Patent Application No. 201580030526.7 and is related to U.S. Appl. No. 15/354,192.
International Search Report; PCT/JP2015/066608 dated Jul. 7, 2015.
Notification of Transmittal of Translation of the International Preliminary Report on Patentability (Chapter I) and Translation of Written Opinion of the International Searching Authority; PCT/JP2015/066608 dated Dec. 22, 2016.
An Office Action mailed by the State Intellectual Property Office of People's Republic of China dated Sep. 4, 2019, which corresponds to Chinese Patent Application No. 201580030526.7 and is related to U.S. Appl. No. 15/354,192.

* cited by examiner

CONDUCTIVE LAMINATE FOR TOUCH PANEL, TOUCH PANEL, AND TRANSPARENT CONDUCTIVE LAMINATE

CROSS-REFERENCE TO RELATED APPLICATIONS

This application is a Continuation of PCT International Application No. PCT/JP2015/066608 filed on Jun. 9, 2015, which claims priority under 35 U.S.C. § 119(a) to Japanese Patent Application No. 2014-119694 filed on Jun. 10, 2014 and Japanese Patent Application No. 2015-029838 filed on Feb. 18, 2015. Each of the above application(s) is hereby expressly incorporated by reference, in its entirety, into the present application.

BACKGROUND OF THE INVENTION

1. Field of the Invention

The present invention relates to a conductive laminate for a touch panel, a touch panel, and a transparent conductive laminate.

2. Description of the Related Art

A conductive laminate having metal wires formed on a substrate has been widely used for electromagnetic shields, touch panels, and transparent planar heating elements of various display devices. Particularly, in recent years, the rate at which touch panels have been mounted on mobile phones or portable game devices has been increasing, and a demand for a conductive laminate for an electrostatic capacitance touch panel capable of performing multi-point detection has been rapidly increasing.

Further, a plating method is known as a technique of forming a metal layer. For example, JP1999-170421A (JP-H11-170421A) discloses a transparent conductive film including a film formed in a predetermined pattern due to exposure to light through a photomask of a photosensitive material that contains an electroless plating catalyst and a patterned metal layer formed on the film by electroless plating. Moreover, a palladium colloid (palladium particles) is used as an electroless plating catalyst in the examples of JP1999-170421A (JP-H11-170421A).

SUMMARY OF THE INVENTION

In recent years, with a demand for improving visibility of a touch panel, a metal layer (metal wiring layer) in a touch panel has been required to minimize reflection of external light and to be visually recognized to have greater blackness in order to satisfy such characteristics. Particularly, in a case where a mesh-like (mesh pattern) metal layer made of copper is used as a sensor electrode in a touch panel, the demand becomes strong. Further, in a case where a conductive laminate which includes a substrate and a patterned metal layer disposed on the substrate is included in a touch panel, the substrate tends to be disposed on a side which can be visually recognized.

When the present inventors evaluated the characteristics of a patterned metal layer (patterned copper layer) formed by a plating method using the palladium colloid described in JP1999-170421A (JP-H11-170421A), the patterned metal layer had a tinge of color when viewed from the film side and thus is required to be have greater blackness.

The present invention has been made in consideration of the above-described circumstances, and an object thereof is to provide a conductive laminate for a touch panel which includes a substrate and a patterned metal layer and in which the patterned metal layer is visually recognized to have greater blackness when seen from the substrate side.

Further, another object of the present invention is to provide a touch panel which includes the above-described conductive laminate for a touch panel and a transparent conductive laminate.

When the present inventors conducted intensive research on problems of the related art, it was found that the problems can be solved by disposing a plated layer formed by a composition containing a predetermined component on a substrate, providing metal ions for the plated layer, and applying a plating treatment thereto to form a metal layer.

In other words, the present inventors found that the above-described problems can be solved by the following configurations.

(1) A conductive laminate for a touch panel comprising: a substrate which has two main surfaces; a patterned plated layer which is disposed on at least one main surface of the substrate and has a functional group that interacts with metal ions; and a patterned metal layer which is disposed on the patterned plated layer, in which the patterned plated layer includes a metal component constituting the patterned metal layer, and a ratio of the average peak intensity resulting from the metal component contained in the patterned plated layer to the average peak intensity resulting from the metal component constituting the patterned metal layer is in a range of 0.5 to 0.95 when the cross sections of the patterned plated layer and the patterned metal layer are composition-ally analyzed using an energy-dispersive X-ray spectroscopy method.

(2) The conductive laminate for a touch panel according to (1), in which the patterned plated layer and the patterned metal layer are disposed on each of the two main surfaces of the substrate.

(3) A conductive laminate for a touch panel comprising: a substrate which has two main surfaces; a patterned resin layer which is disposed on at least one main surface of the substrate; and a patterned metal layer which is disposed on the patterned resin layer, in this order, in which at least one of the following Requirement A or Requirement B is satisfied, Requirement A: metal particles having an average particle diameter of 10 to 1000 nm are present on a surface layer region over 500 nm in a direction from an interface between the patterned resin layer and the patterned metal layer to the patterned resin layer side, and Requirement B: the interface between the patterned resin layer and the patterned metal layer has an uneven shape, the arithmetic average roughness Ra of the uneven shape is in a range of 5 to 1000 nm, and the average distance between concave portions in the uneven shape is in a range of 10 to 1000 nm.

(4) The conductive laminate for a touch panel according to any one of (1) to (3), in which the substrate is a glass substrate or a resin substrate.

(5) The conductive laminate for a touch panel according to any one of (1) to (4), in which a primer layer is disposed adjacent to the main surface of the substrate.

(6) The conductive laminate for a touch panel according to any one of (1) to (5), in which the patterned metal layer contains copper.

(7) A touch panel comprising: the conductive laminate for a touch panel according to any one of (1) to (6).

(8) A transparent conductive laminate comprising: a substrate which has two main surfaces; a patterned plated layer which is disposed on at least one main surface of the substrate and has a functional group that interacts with metal ions; and a patterned metal layer which is disposed on the patterned plated layer, in which the patterned plated layer includes a metal component constituting the patterned metal layer, and the ratio of the average peak intensity resulting from the metal component contained in the patterned plated layer to the average peak intensity resulting from the metal component constituting the patterned metal layer is in a range of 0.50 to 0.95 when the cross sections of the patterned plated layer and the patterned metal layer are compositionally analyzed using an energy-dispersive X-ray spectroscopy method.

According to the present invention, it is possible to provide a conductive laminate for a touch panel (that is, a conductive laminate for a touch panel in which the rear surface (surface on the substrate side) of the patterned metal layer is visually recognized to have greater blackness) which includes a substrate and a patterned metal layer and in which the patterned metal layer is visually recognized to have greater blackness when seen from the substrate side.

Further, according to the present invention, it is possible to provide a touch panel which includes the above-described conductive laminate for a touch panel and a transparent conductive laminate.

DESCRIPTION OF THE PREFERRED EMBODIMENTS

Figure 1:
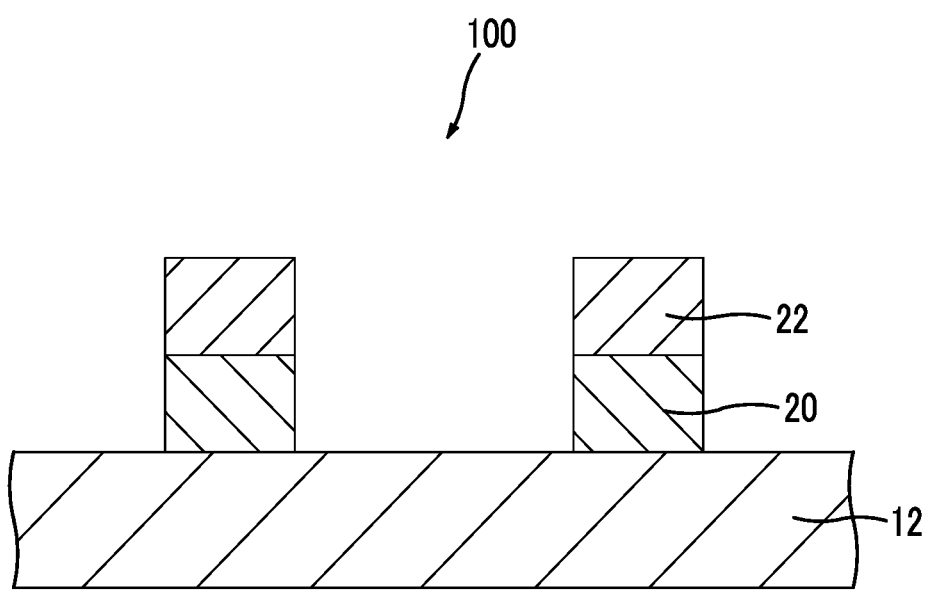
FIG. 1 is a cross-sectional view of a conductive laminate for a touch panel according to a first embodiment of the present invention.

Hereinafter, a conductive laminate for a touch panel of the present invention will be described in detail. In the present specification, the numerical ranges shown using "to" indicate ranges including the numerical values described before and after "to" as the lower limits and the upper limits.

First, one of the characteristics of the conductive laminate for a touch panel according to an embodiment (particularly, a first embodiment and a second embodiment described below) of the present invention compared to the related art is to use a catalyst-imparting solution which includes a plating catalyst showing a predetermined pH or a precursor thereof when a patterned metal layer is formed by carrying out a plating treatment after a patterned plated layer is formed.

According to the embodiment of the conductive laminate for a touch panel as described below, the patterned metal layer is formed by providing metal ions for the patterned plated layer formed by a composition containing a predetermined component and applying a plating treatment thereto. In a case where the patterned metal layer is formed according to such a method, first, the treatment of providing metal ions, functioning as a plating catalyst, for the patterned plated layer is performed before the plating treatment is performed. At this time, a catalyst-imparting solution including metal ions is used, but the present inventors found that the behavior of the subsequent plating treatment varies greatly due to the pH of the catalyst-imparting solution. That is, in a case where a catalyst-imparting solution showing a predetermined pH is used, a metal layer is formed in a predetermined position on the patterned plated layer to form a patterned metal layer during the subsequent plating treatment. Such a patterned metal layer is visually recognized to have greater blackness compared to the aspect of JP1999-170421A (JP-H11-170421A) when observed from the rear surface side (patterned plated layer side) to obtain desired effects. As the cause for obtaining such desired effects, a metal component, constituting the patterned metal layer, being included in the patterned plated layer may be exemplified. More specifically, when the catalyst-imparting solution is used, the amount of metal ions to be provided for the patterned plated layer becomes large and a desired patterned metal layer is easily formed by the subsequent plating treatment. The specific reason is not clear, but it was found that the metal component constituting the patterned metal layer is deposited on the patterned plated layer and affects the visibility of the patterned metal layer.

Meanwhile, in a case where a catalyst-imparting solution having a pH which is not in a predetermined range is used, a problem that a patterned metal layer cannot be obtained in the first place or a metal layer is deposited on a portion other than the patterned plated layer is generated and thus the use for touch panel applications is limited.

Further, other reasons why the effects of the present invention can be obtained are as follows.

As described above, in a case where the metal component is deposited on the patterned plated layer, a catalyst metal on the surface of the plated layer or a metal to be plated enters the plated layer in a complicated manner, a fine uneven shape is formed on the interface between the patterned metal layer and the patterned plated layer to be formed. At this time, the metal having entered the plated layer may be present in the form of metal powder independent from the inside of the plated layer or may be formed in a fractal shape having unevenness on the interface between the plated layer and the patterned metal layer adhered to the surface of the patterned metal layer. If such a conductive laminate for a touch panel is viewed from the substrate side, as the result, the rear surface side of the patterned metal layer is visually recognized to have greater blackness when light is absorbed due to the presence of the metal particles or the reflection of light is suppressed due to the fine uneven structure on the plated layer side of the patterned metal layer. Further, since the patterned metal layer formed by the plating treatment is densely filled with metals, conductive properties are excellent.

In a case where the plating treatment is used, the process temperature at the time of production can be maintained to be low (for example, 100° C. or lower) and damage to the substrate can be suppressed without performing a high-temperature heating treatment through sputtering or the like.

In JP1999-170421A (JP-H11-170421A), since a photo-sensitive material contains a particulate electroless plating catalyst, light is scattered by the particulate electroless plating catalyst when exposure light is applied for patterning the photosensitive material. Therefore, the line width of the patterning to be formed cannot be reduced. On the contrary, according to the above-described method of the present invention, since metal ions are provided after the plated layer is patterned in advance, a pattern with a smaller line width can be formed and thus a patterned metal layer having a small line width can be formed on the thin patterned plated layer.

Further, in the specification described below, the patterned metal layer being visually recognized to have blackness indicates that the rear surface side of the patterned metal layer (patterned plated layer side) is visually recognized to have blackness as described above.

First Embodiment

FIG. 1 is a cross-sectional view of a conductive laminate for a touch panel according to the first embodiment of the present invention.

A conductive laminate for a touch panel (hereinafter, also simply referred to as a "laminate") 100 comprises a substrate 12, a patterned plated layer 20, and a patterned metal layer 22.

Hereinafter, first, a method of producing a laminate will be described in detail and then the configuration of the laminate will be described in detail.

<Method of Producing Laminate>

The method of producing a laminate includes a process (process 1) of forming a patterned plated layer on a substrate and a process (process 2) of forming a patterned metal layer on the patterned plated layer.

Hereinafter, members and materials to be used for each process and the procedures thereof will be described in detail.

[Process 1: Process of Forming Patterned Plated Layer]

Figure 2A:
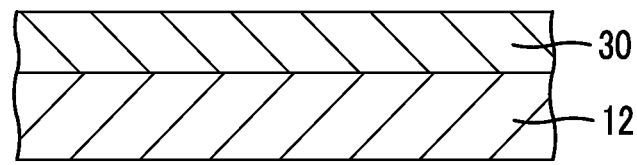
FIGS. 2A to 2D are cross-sectional views illustrating a method of producing a conductive laminate for a touch panel according to the first embodiment of the present invention in order of processes.
Figure 2B:
Figure 2B:
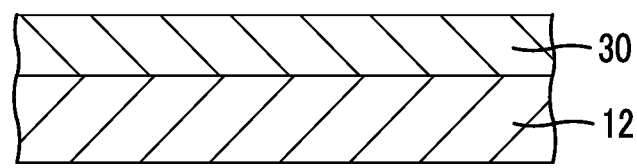
Figure 2C:
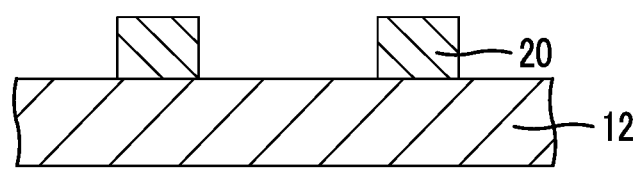

The process 1 is a process of providing energy, in a pattern shape, for a composition for forming a plated layer which contains a compound having a functional group (hereinafter, also referred to as an "interactive group") interacting with metal ions and a polymerizable group to form a patterned plated layer on a substrate. More specifically, the process 1 is a process of firstly forming a coated film 30 of the composition for forming a plated layer on the substrate 12 as illustrated in FIG. 2A, providing energy, in a pattern shape, for the obtained coated film 30 as indicated by a black arrow to promote a reaction of a polymerizable group such that the coated film is cured as illustrated in FIG. 2B, and removing a region for which the energy is not provided to obtain the patterned plated layer 20 (FIG. 2C).

The patterned plated layer to be formed by the above-described process adsorbs (is adhered to) metal ions during the process 2 in response to the function of the interactive group. That is, the patterned plated layer functions excellently as a layer of receiving metal ions. Further, the polymerizable group is used for bonding compounds to each other by the curing treatment through provision of energy to obtain a patterned plated layer having excellent hardness and degree of hardness.

Hereinafter, first, members and materials used for the present processes will be described in detail and then the procedures of the processes will be described in detail.

(Substrate)

The substrate has two main surfaces and the type thereof is not particularly limited as long as the substrate supports the patterned plated layer described below. As the substrate, an insulating substrate is preferable. More specifically, a resin substrate, a ceramic substrate, a glass substrate, or a glass substrate of a liquid crystal cell can be used.

Examples of the material of the resin substrate include polyethylene terephthalate, polyethylene naphthalate, polyether sulfone, a polyacrylic resin, a polyurethane-based resin, polyester, polycarbonate, polysulfone, polyamide, polyarylate, polyolefin, a cellulose-based resin, polyvinyl chloride, and a cycloolefin-based resin. Among these, polyethylene terephthalate, polyethylene naphthalate, or polyolefin is preferable.

The thickness (mm) of the substrate is not particularly limited, but is preferably in a range of 0.05 to 2 mm and more preferably in a range of 0.1 to 1 mm from the viewpoint of balance between handleability and reduction in thickness.

Further, it is preferable that the substrate properly transmits light. Specifically, the total light transmittance of the substrate is preferably in a range of 85% to 100%.

Moreover, the substrate may have a multilayer structure and one of the layers may be a functional film. Further, the substrate may be formed of a functional film. The functional film is not particularly limited, and examples thereof include a polarizing plate, a phase difference film, cover plastic, a hard coat film, a barrier film, a pressure sensitive film, an electromagnetic wave shielding film, a heat-generating film, an antenna film, and a wiring film for a device other than a touch panel.

Specific examples of the functional film used for a liquid crystal cell particularly associated with a touch panel include a polarizing plate such as NPF SERIES (manufactured by Nitto Denko Corporation) or HLC2 SERIES (manufactured by SANRITZH ELECTRONICS CO., LTD.); a phase difference film such as a WV FILM (manufactured by Fujifilm Corporation); cover plastic such as FAINDE (manufactured by Dai Nippon Printing Co., Ltd.), TECHNOLLOY (manufactured by Sumitomo Chemical Company, Limited.), IUPILON (manufactured by Mitsubishi Gas Chemical Company), SHILL-PLUS (manufactured by NIPPON STEEL & SUMITOMO METAL CORPORATION), ORGA (manufactured by Nippon Synthetic Chemical Industry Co., Ltd.), or SHORAYAL (manufactured by Showa Denko K.K.); and a hard coat film such as H SERIES (manufactured by LINTEC Corporation), FHC SERIES (manufactured by HIGASHI-YAMA FILM CO., LTD.), or a KB FILM (manufactured by KIMOTO CO., LTD.). These may form the plated layer of the present invention on the surface of each functional film.

Further, cellulose triacetate may be occasionally used for a polarizing plate or a phase difference film as described in JP2007-26426A, but cellulose triacetate may be changed into a cycloolefin (co)polymer and then used from the viewpoint of resistance to the plating process and ZEONOR (manufactured by Zeon corporation) may be exemplified.

(Composition for Forming Plated Layer)

A composition for forming a plated layer contains a compound having a functional group interacting with metal ions and a polymerizable group.

The functional group interacting with metal ions indicates a functional group which is capable of interacting with metal ions provided for the patterned plated layer during the process described below. For example, as the functional group, a functional group that is capable of forming electrostatic interaction with metal ions or a nitrogen-containing functional group, a sulfur-containing functional group, or an oxygen-containing functional group which is capable of forming coordination with metal ions can be used.

More specific examples of the interactive group include a nitrogen-containing functional group such as an amino group, an amide group, an imide group, a urea group, a tertiary amino group, an ammonium group, an amidino group, a triazine ring, a triazole ring, a benzotriazole group, an amidazole group, a benzimidazole group, a quinoline group, a pyridine group, a pyrimidine group, a pyrazine group, a quinazoline group, a quinoxaline group, a purine group, a triazine group, a piperidine group, a piperazine group, a pyrrolidine group, a pyrazole group, an aniline group, a group having an alkylamine structure, a group having an isocyanuric structure, a nitro group, a nitroso group, an azo group, a diazo group, an azido group, a cyano group, or a cyanate group (R—O—CN); an oxygen-containing functional group such as an ether group, a hydroxyl group, a phenolic hydroxyl group, a carboxyl group, a carbonate group, a carbonyl group, an ester group, a group having a N-oxide structure, a group having a S-oxide structure, or a group having a N-hydroxy structure; a sulfur-containing functional group such as a thiophene group, a thiol group, a thiourea group, a thiocyanuric acid group, a benzothiazole group, a mercaptotriazine group, a thioether group, a thioxy group, a sulfoxide group, a sulfone group, a sulfite group, a group having a sulfoximine structure, a group having a sulfoxonium salt structure, a sulfonic acid group, or a group having a sulfonic acid ester structure; a phosphorus-containing functional group such as a phosphate group, a phosphoroamide group, a phosphine group, or a group having a phosphoric acid ester structure; and a group having a halogen atom such as chlorine or bromine, and salts thereof can be used in functional group which may have a salt structure.

Among these, from the viewpoint of high polarity and high adsorption ability to metal ions, an ionic polar group such as a carboxyl group, a sulfonic acid group, a phosphoric acid group, or a boronic acid group, an ether group, or a cyano group is particularly preferable and a carboxyl group or a cyano group is more particularly preferable.

A compound may include two or more interactive groups. Further, the number of interactive groups in a compound is not particularly limited, and one or two or more interactive groups may be included in a compound.

A polymerizable group is a functional group which is capable of forming a chemical bond by providing energy, and examples thereof include a radical polymerizable group and a cationic polymerizable group. Among these, from the viewpoint of more excellent reactivity, a radical polymerizable group is preferable. Examples of the radical polymerizable group include an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, or a maleic acid ester group, a styryl group, a vinyl group, an acrylamide group, and a methacrylamide group. Among these, a methacryloyloxy group, an acryloyloxy group, a vinyl group, a styryl group, an acrylamide group, or a methacrylamide group is preferable and a methacryloyloxy group, an acryloyloxy group, or a styryl group is particularly preferable.

A compound may include two or more polymerizable groups. Further, the number of polymerizable groups in a compound is not particularly limited, and one or two or more polymerizable groups may be included in a compound.

The compound may be a low molecular weight compound or a high molecular weight compound. The low molecular weight compound indicates a compound having a molecular weight of less than 1000 and the high molecular weight compound indicates a compound having a molecular weight of 1000 or greater.

Moreover, a low molecular weight compound having the above-described polymerizable groups corresponds to a so-called monomer. Further, a high molecular weight compound may be a polymer having a predetermined repeating unit.

Moreover, compounds may be used alone or in combination of two or more kinds thereof.

In a case where the compound is a polymer, the weight average molecular weight of the polymer is not particularly limited, but is preferably in a range of 1000 to 700000 and more preferably in a range of 2000 to 200000, from the viewpoint of more excellent handleability such as solubility. From the viewpoint of polymerization sensitivity, the weight average molecular weight thereof is particularly preferably 20000 or greater.

A method of synthesizing such a polymer having a polymerizable group and an interactive group is not particularly limited, but a known synthesis method (see paragraphs [0097] to [0125] of JP2009-280905A) is used.

Preferred Embodiment 1 of Polymer

Examples of the preferred first embodiment of the polymer include a copolymer including a repeating unit (hereinafter, suitably also referred to as a polymerizable group unit) that has a polymerizable group represented by the following Formula (a) and a repeating unit (hereinafter, suitably also referred to as an interactive group unit) that has an interactive group represented by the following Formula (b).

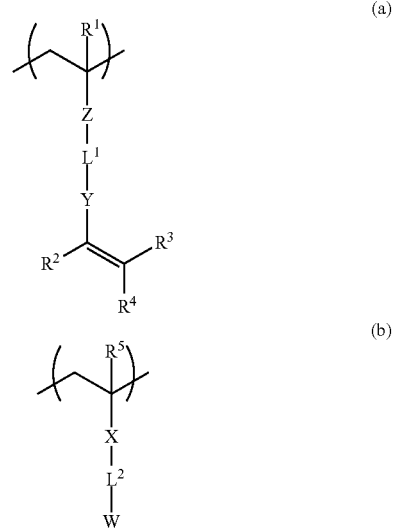

In the above-described Formulae (a) and (b), $R^1$ to $R^5$ each independently represent a hydrogen atom or a substituted or unsubstituted alkyl group (such as a methyl group, an ethyl group, a propyl group, or a butyl group). Further, the type of substituent is not particularly limited, and examples thereof include a methoxy group, a chlorine atom, a bromine atom, and a fluorine atom.

Moreover, it is preferable that $R^1$ represents a hydrogen atom, a methyl group, or a methyl group substituted with a bromine atom. It is preferable that $R^2$ represents a hydrogen atom, a methyl group, or a methyl group substituted with a bromine atom. It is preferable that $R^3$ represents a hydrogen atom. It is preferable that $R^4$ represents a hydrogen atom. It is preferable that $R^5$ represents a hydrogen atom, a methyl group, or a methyl group substituted with a bromine atom.

In the above-described Formulae (a) and (b), X, Y, and Z each independently represent a single bond or a substituted or unsubstituted divalent organic group. Examples of the divalent organic group include a substituted or unsubstituted divalent aliphatic hydrocarbon group (having preferably 1 to 8 carbon atoms, for example, an alkylene group such as a methylene group, an ethylene group, or a propylene group), a substituted or unsubstituted divalent aromatic hydrocarbon group (having preferably 6 to 12 carbon atoms, for example, a phenylene group), —O—, —S—, —SO$_2$—, —N(R)— (R: alkyl group), —CO—, —NH—, —COO—, —CONH—, and a combination of these (for example, an alkyleneoxy group, an alkyleneoxy carbonyl group, or an alkylene carbonyloxy group).

From the viewpoints that a polymer is easily synthesized and adhesiveness of a patterned metal layer is more excellent, it is preferable that X, Y, and Z represent a single bond, an ester group (—COO—), an amide group (—CONH—), an ether group (—O—), or a substituted or unsubstituted divalent aromatic hydrocarbon group and more preferable that X, Y, and Z represent a single bond, an ester group (—COO—), or an amide group (—CONH—).

In the above-described Formulae (a) and (b), $L^1$ and $L^2$ each independently represent a single bond or a substituted or unsubstituted divalent organic group. The divalent organic group has the same definition as that for the divalent organic group described in X, Y, and Z above.

From the viewpoints that a polymer is easily synthesized and adhesiveness of a patterned metal layer is more excellent, it is preferable that $L^1$ represents an aliphatic hydrocarbon group, a urethane bond, or a divalent organic group having a urethane bond (for example, an aliphatic hydrocarbon group). Among these, a group having 1 to 9 carbon atoms is preferable. Further, here, the total number of carbon atoms of $L^1$ indicates the total number of carbon atoms included in a substituted or unsubstituted divalent organic group represented by $L^1$.

Moreover, from the viewpoint that adhesiveness of a patterned metal layer is more excellent, it is preferable that $L^2$ represents a single bond, a divalent aliphatic hydrocarbon group, a divalent aromatic hydrocarbon group, or a combination of these. Among these, it is preferable that $L^2$ represents a single bond or a group having 1 to 15 carbon atoms, and particularly an unsubstituted group is preferable. Further, here, the total number of carbon atoms of $L^2$ indicates the total number of carbon atoms included in a substituted or unsubstituted divalent organic group represented by $L^2$.

In the above-described Formula (b), W represents an interactive group. The interactive group has the definition as described above.

From the viewpoints of reactivity (curability and polymerization properties) and suppressing gelation during synthesis, the content of the polymerizable group unit is preferably in a range of 5 to 50% by mole and more preferably in a range of 5 to 40% by mole with respect to the total content of all repeating units in a polymer.

Further, from the viewpoint of adsorptivity to metal ions, the content of the interactive group unit is preferably in a range of 5 to 95% by mole and more preferably in a range of 10 to 95% by mole with respect to the total content of all repeating units in a polymer.

Preferred Embodiment 2 of Polymer

Examples of the preferred second embodiment of the polymer include copolymers having repeating units represented by the following Formulae (A), (B), and (C).

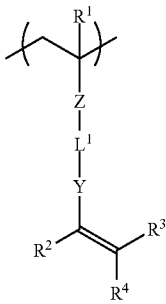

(A)

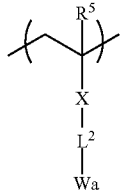

(B)

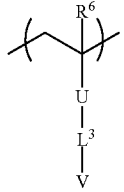

(C)

The repeating unit represented by Formula (A) is the same as repeating unit represented by the above-described Formula (a) and descriptions of respective groups are the same as described above.

$R^5$, X, and $L^2$ in the repeating unit represented by Formula (B) are the same as $R^5$, X, and $L^2$ in the repeating unit represented by the above-described Formula (b) and descriptions of respective groups are the same as described above.

Wa in Formula (B) represents a group interacting with metal ions other than a hydrophilic group represented by V described below or a precursor group thereof. Among the examples, a cyano group or an ether group is preferable.

In Formula (C), $R^6$ represents a hydrogen atom or a substituted or unsubstituted alkyl group.

In Formula (C), U represents a single bond or a substituted or unsubstituted divalent organic group. The divalent organic group has the same definition as that for the divalent organic group described in X, Y, and Z above. From the viewpoints that a polymer is easily synthesized and adhesiveness of a patterned metal layer is more excellent, it is preferable that U represents a single bond, an ester group (—COO—), an amide group (—CONH—), an ether group (—O—), or a substituted or unsubstituted divalent aromatic hydrocarbon group.

In Formula (C), $L^3$ represents a single bond or a substituted or unsubstituted divalent organic group. The divalent organic group has the same definition as that for the divalent organic group described in $L^1$ and $L^2$ above. From the viewpoints that a polymer is easily synthesized and adhesiveness of a patterned metal layer is more excellent, it is preferable that $L^3$ represents a single bond, a divalent aliphatic hydrocarbon group, a divalent aromatic hydrocarbon group, or a combination of these.

In Formula (C), V represents a hydrophilic group or a precursor group thereof. The hydrophilic group is not particularly limited as long as the group has hydrophilicity, and examples thereof include a hydroxyl group and a carboxylic acid group. Further, the precursor group of a hydrophilic group indicates a group generating a hydrophilic group by carrying out a predetermined treatment (for example, a treatment using an acid or an alkali), and examples thereof include a carboxyl group protected by THP (2-tetrahaydropyranyl group).

From the viewpoint of interaction with metal ions, it is preferable that the hydrophilic group is an ionic polar group. Specific examples of the ionic polar group include a carboxylic acid group, a sulfonic acid group, a phosphoric acid group, and a boronic acid group. Among these, from the viewpoint of moderate acidity (other functional groups are not decomposed), a carboxylic acid group is preferable.

The preferable content of each unit of the above-described polymer according to the preferred second embodiment is as follows.

From the viewpoints of reactivity (curability and polymerization properties) and suppressing gelation during synthesis, the content of the repeating unit represented by Formula (A) is preferably in a range of 5 to 50% by mole and more preferably in a range of 5 to 30% by mole with respect to the total content of all repeating units in a polymer.

Further, from the viewpoint of adsorptivity to metal ions, the content of the repeating unit represented by Formula (B) is preferably in a range of 5 to 75% by mole and more preferably in a range of 10 to 70% by mole with respect to the total content of all repeating units in a polymer.

From the viewpoints of developability using an aqueous solution and resistance to moisture and adhesiveness, the content of the repeating unit represented by Formula (C) is preferably in a range of 10 to 70% by mole, more preferably in a range of 20 to 60% by mole, and still more preferably in a range of 30 to 50% by mole with respect to the total content of all repeating units in a polymer.

Specific examples of the polymer include polymers described in paragraphs [0106] to [0112] of JP2009-007540A, polymers described in paragraphs [0065] to [0070] of JP2006-135271A, and polymers described in paragraphs [0030] to [0108] of US2010-080964.

These polymers can be produced using known methods (for example, methods exemplified in the literature described above).

Preferred Embodiment of Monomer

In a case where the above-described compound is a so-called monomer, a compound represented by Formula (X) may be exemplified as one preferred embodiment.

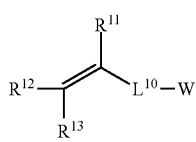

Formula (X)

In Formula (X), $R^{11}$ to $R^{13}$ each independently represent a hydrogen atom or a substituted or unsubstituted alkyl group. Examples of the unsubstituted alkyl group include a methyl group, an ethyl group, a propyl group, and a butyl group. Further, examples of the substituted alkyl group include a methoxy group, a chlorine atom, a bromine atom, and a methyl group, ethyl group, propyl group, or butyl group substituted with a fluorine atom or the like. Further, it is preferable that $R^{11}$ represents a hydrogen atom or a methyl group. It is preferable that $R^{12}$ represents a hydrogen atom. It is preferable that $R^{13}$ represents a hydrogen atom.

$L^{10}$ represents a single bond or a divalent organic group. Examples of the divalent organic group include a substituted or unsubstituted aliphatic hydrocarbon group (having preferably 1 to 8 carbon atoms), a substituted or unsubstituted aromatic hydrocarbon group (having preferably 6 to 12 carbon atoms), —O—, —S—, —SO$_2$—, (R: alkyl group), —CO—, —NH—, —COO—, —CONH—, and a combination of these (for example, an alkyleneoxy group, an alkyleneoxy carbonyl group, or an alkylene carbonyloxy group).

As the substituted or unsubstituted aliphatic hydrocarbon group, a methylene group, an ethylene group, a propylene group, or a butylene group, or a group obtained by any of these groups being substituted with a methoxy group, a chlorine atom, a bromine atom, or a fluorine atom is preferable.

As the substituted or unsubstituted aromatic hydrocarbon group, an unsubstituted phenylene group or a phenylene group substituted with a methoxy group, a chlorine atom, a bromine atom, or a fluorine atom is preferable.

In Formula (X), as one preferred embodiment of $L^{10}$, a —NH-aliphatic hydrocarbon group- or a —CO-aliphatic hydrocarbon group— may be exemplified.

W has the same definition as that for W of Formula (b) and represents an interactive group. The definitions of the interactive groups are as described above.

In Formula (X), an ionic polar group is exemplified as a preferred embodiment of W, and a carboxylic acid group is more preferable.

In a case where the compound is a so-called monomer, a compound represented by Formula (1) may be exemplified as one of other preferred embodiments.

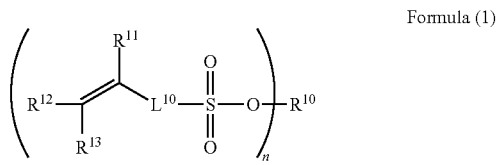

Formula (1)

In Formula (1), $R^{10}$ represents a hydrogen atom, a metal cation, or a quaternary ammonium cation. Examples of the metal cation include an alkali metal cation (a sodium ion or a calcium ion), a copper ion, a palladium ion, and a silver ion. Further, a monovalent or a divalent metal cation is used as the metal cation. In a case where a divalent metal cation (for example, a palladium ion) is used, n described below represents 2.

Examples of the quaternary ammonium cation include a tetramethyl ammonium ion and a tetrabutyl ammonium ion.

Among these, from the viewpoints of adhesion to metal ions and metal residues after patterning, a hydrogen atom is preferable.

$L^{10}$ in Formula (1) has the same definition as that for $L^{10}$ in Formula (X) described above and represents a single bond or a divalent organic group. The definition of the divalent organic group is as described above.

$R^{11}$ to $R^{13}$ of Formula (1) have the same definitions as those for $R^{11}$ to $R^{13}$ of Formula (X) described above and represent a hydrogen atom or a substituted or unsubstituted alkyl group. In addition, preferred embodiments of $R^{11}$ to $R^{13}$ are as described above.

n represents an integer of 1 or 2. Among these, from the viewpoint of availability of a compound, it is preferable that n represents 1.

As a preferred embodiment of the compound represented by Formula (1), a compound represented by Formula (2) may be exemplified.

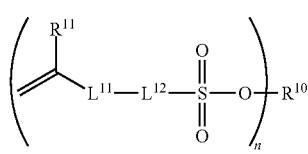

Formula (2)

In Formula (2), $R^{10}$, $R^{11}$, and n have the same definitions as described above.

$L^{11}$ represents an ester group (—COO—), an amide group (—CONH—), or a phenylene group. Among these, when $L^{11}$ represents an amide group, the polymerization properties of a plated layer to be obtained and solvent resistance (for example, alkali solvent resistance) are improved.

$L^{12}$ represents a single bond, a divalent aliphatic hydrocarbon group (having preferably 1 to 8 carbon atoms and more preferably 3 to 5 carbon atoms), or a divalent aromatic hydrocarbon group. The aliphatic hydrocarbon group may be linear, branched, or cyclic. Further, in a case where $L^{12}$ represents a single bond, $L^{11}$ represents a phenylene group.

From the viewpoints of volatility, solubility in a solvent, film forming properties, and handleability, the molecular weight of the compound represented by Formula (1) is not particularly limited, but is preferably in a range of 100 to 1000 and more preferably in a range of 100 to 300.

The content of the compound in the composition for forming a plated layer is not particularly limited, but is preferably in a range of 2 to 50% by mass and more preferably in a range of 5 to 30% by mass with respect to the total amount of the composition. When the content thereof is in the above-described range, handleability of the composition becomes excellent and the layer thickness of the patterned plated layer is easily controlled.

From the viewpoint of handleability, it is preferable that the composition for forming a plated layer contains a solvent.

The solvent which can be used is not particularly limited, and examples thereof include water; an alcohol-based solvent such as methanol, ethanol, propanol, ethylene glycol, 1-methoxy-2-propanol, glycerin, propylene glycol monomethyl ether; an acid such as acetic acid; a ketone-based solvent such as acetone, methyl ethyl ketone, or cyclohexanone; an amide-based solvent such as formamide, dimethyl acetamide, or N-methylpyrrolidone; a nitrile-based solvent such as acetonitrile or propionitrile; an ester-based solvent such as methyl acetate or ethyl acetate; a carbonate-based solvent such as dimethyl carbonate or diethyl carbonate; an ether-based solvent; a glycol-based solvent; an amine-based solvent; a thiol-based solvent; and a halogen-based solvent.

Among these, an alcohol-based solvent, an amide-based solvent, a ketone-based solvent, a nitrile-based solvent, or a carbonate-based solvent is preferable.

The content of the solvent in the composition for forming a plated layer is not particularly limited, but is preferably in a range of 50 to 98% by mass and more preferably in a range of 70 to 95% by mass with respect to the total amount of the composition. When the content thereof is in the above-described range, handleability of the composition becomes excellent and the layer thickness of the patterned plated layer is easily controlled.

The composition for forming a plated layer may include a polymerization initiator. When the composition includes a polymerization initiator, compounds or a compound and a substrate are more bonded to each other and, accordingly, a patterned metal layer having excellent adhesiveness can be obtained.

The polymerization initiator to be used is not particularly limited, and a thermal polymerization initiator or a photopolymerization initiator can be used. Examples of the photopolymerization initiator include benzophenones, acetophenones, α-aminoalkylphenones, benzoins, ketones, thioxanthones, benzyls, benzyl ketals, oxime esters, anthrones, tetramethylthiuram monosulfides, bisacylphosphine oxides, acylphosphine oxides, anthraquinones, and an azo compound, and derivatives thereof.

Moreover, examples of the thermal polymerization initiator include a diazo-based compound and a peroxide-based compound.

In a case where the compound for forming a plated layer includes a polymerization initiator, the content of the polymerization initiator is preferably in a range of 0.01 to 1% by mass and more preferably in a range of 0.1 to 0.5% by mass with respect to the total amount of the composition. When the content thereof is in the above-described range, the handleability of the composition becomes excellent and the adhesiveness of the patterned metal layer to be obtained becomes more excellent.

The composition for forming a plated layer may include a monomer (here, a compound represented by the above-described Formula (X) or Formula (1) is excluded). When the composition includes a monomer, the crosslinking density or the like of the plated layer can be appropriately controlled.

The monomer to be used is not particularly limited, and examples of a compound having addition polymerization properties include a compound having an ethylenically unsaturated bond and examples of a compound having ring-opening polymerization properties include a compound having an epoxy group. Among these, a polyfunctional monomer is suitably used from the viewpoints of improving the crosslinking density of the patterned plated layer and further improving the adhesiveness of the patterned metal layer. The polyfunctional monomer indicates a monomer having two or more polymerizable groups. Specifically, it is preferable to use a monomer having 2 to 6 polymerizable groups.

From the viewpoint of mobility of molecules during the crosslinking reaction affecting the reactivity, the molecular weight of the polyfunctional monomer to be used is preferably in a range of 150 to 1000 and more preferably in a range of 200 to 700. Moreover, the number of atoms as the space (distance) among a plurality of polymerizable groups is preferably in a range of 1 to 15 and more preferably in a range of 6 to 10.

Other additives (such as a sensitizer, a curing agent, a polymerization inhibitor, an antioxidant, an antistatic agent, an ultraviolet absorber, a filler, particles, a flame retardant, a surfactant, a lubricant, and a plasticizer) may be added to the composition for forming a plated layer as needed.

Hereinbefore, the composition for forming a plated layer that contains a compound having an interactive group and a polymerizable group has been described, but the composition is not limited thereto and the composition for forming a plated layer may contain a compound having an interactive group and a compound having a polymerizable group.

The definitions of the interactive groups and the polymerizable groups are as described above.

The compound having an interactive group is a compound having an interactive group. The definition of the interactive group is as described above. Such a compound may be a low molecular weight compound or a high molecular weight compound. As a preferred embodiment of the compound having an interactive group, a polymer (for example, polyacrylic acid) having a repeating unit represented by the above-described Formula (b) may be exemplified. Moreover, the compound having an interactive group does not include a polymerizable group.

The compound having a polymerizable group is a so-called monomer, and a polyfunctional monomer having two or more polymerizable groups is preferable from the viewpoint that the hardness of a plated layer to be formed is more excellent. Specifically, it is preferable to use a monomer having 2 to 6 polymerizable groups as a polyfunctional monomer. From the viewpoint of mobility of molecules during the crosslinking reaction affecting the reactivity, the molecular weight of the polyfunctional monomer to be used is preferably in a range of 150 to 1000 and more preferably in a range of 200 to 700. Moreover, the number of atoms as the space (distance) among a plurality of polymerizable groups is preferably in a range of 1 to 15 and more preferably in a range of 6 to 10.

(Procedures of Process 1)

In the process 1, first, the composition for forming a plated layer is disposed on the substrate, but the method thereof is not particularly limited. For example, a method of bring the composition for forming a plated layer into contact with the substrate to form a coated film of a composition for forming a plated layer (precursor layer of a plated layer) may be used. As the method, for example, a method (coating method) of coating the substrate with the composition for forming a plated layer may be used.

In a case where a coating method is used, the method of coating the substrate with the composition for forming a plated layer is not particularly limited and a known method (for example, spin coating, die coating, or dip coating) can be used.

From the viewpoint of handleability or production efficiency, an embodiment of coating the substrate with the composition for forming a plated layer and removing a remaining solvent by carrying out a drying treatment, if necessary, to form a coated film is preferable.

In addition, the conditions of the drying treatment are not particularly limited, but it is preferable that the drying treatment is performed under conditions of a temperature range of room temperature to 220° C. (preferably 50° C. to 120° C.) for 1 minute to 30 minutes (preferably 1 to 10 minutes) from the viewpoint of more excellent productivity.

The method of providing energy, in a pattern shape, for a coated film including the compound on the substrate is not particularly limited. For example, it is preferable to use a heat treatment or an exposure treatment (light irradiation treatment). From the viewpoint that the treatment is finished in a short period of time, an exposure treatment is preferable. When energy is provided for a coated film, a polymerizable group in a compound is activated, crosslinking occurs between compounds, and curing of a layer is accelerated.

During the exposure treatment, light is applied using a UV lamp or visible light. Examples of a light source include a mercury lamp, a metal halide lamp, a xenon lamp, a chemical lamp, and a carbon arc lamp. Examples of radiation include electron beams, X-rays, ion beams, and far-infrared rays. As preferred embodiments, specifically, scanning exposure using an infrared laser, flash exposure having high illumination using a xenon discharge lamp, or exposure using an infrared lamp may be exemplified.

The exposure time varies depending on the reactivity of a compound and the light source, but is typically in a range of 10 seconds to 5 hours. The exposure energy may be in a range of 10 to 8000 mJ and preferably in a range of 50 to 3000 mJ.

In addition, the method of performing the exposure treatment in a pattern shape is not particularly limited, and a known method may be employed. For example, exposure light may be applied to a coated film through a mask.

In addition, in a case where a heat treatment is used for providing energy, an air sending drier, an oven, an infrared drier, or a heating drum can be used.

Next, a portion in a coated film for which energy is not provided is removed to form a patterned plated layer.

The removal method is not particularly limited, and an optimum method which is suitable for a compound to be used is selected. For example, a method of using an alkaline solution (the pH thereof is preferably in a range of 13.0 to 13.8) as a developer may be used. In a case where a region for which energy is not provided is removed using an alkaline solution, a method of immersing a substrate having a coated film for which energy is provided in a solution or a method of coating a substrate with a developer may be used, and the immersion method is preferable. In a case of the immersion method, from the viewpoint of productivity and workability, the immersion time is preferably in a range of 1 minute to 30 minutes.

In addition, as other methods, a method of using a solvent that dissolves the compound as a developer and immersing a substrate in the developer may be exemplified.

(Patterned Plated Layer)

The thickness of the patterned plated layer to be formed by the above-described treatment is not particularly limited, but is preferably in a range of 0.01 to 10 μm, more preferably in a range of 0.2 to 5 μm, and particularly preferably in a range of 0.3 to 1.0 μm, from the viewpoint of productivity.

The pattern shape of the patterned plated layer is not particularly limited and is adjusted according to the place expected to form a patterned metal layer described below. Further, a mesh pattern or the like may be exemplified as the pattern shape. In a case of a mesh pattern, a length W of one side of a lattice (opening portion) in the mesh pattern is preferably 800 μm or less and more preferably 600 μm or less. The length W thereof is preferably 50 μm or greater and more preferably 400 μm or greater. Moreover, the shape of the lattice is not particularly limited, and examples thereof include a rhombus shape and a polygonal shape (such as a triangular shape, a square shape, or a hexagonal shape). Further, the shape of one side may be linear, curved, or a circular arc.

Further, the line width of the patterned plated layer is not particularly limited, but is preferably 30 μm or less, more preferably 15 μm or less, still more preferably 10 μm or less, particularly preferably 9 μm or less, and most preferably 7 μm or less, from the viewpoint of low resistance of the patterned metal layer disposed on the patterned plated layer. In addition, the line width thereof is preferably 0.5 μm or greater and more preferably 1.0 μm or greater.

[Process 2: Process of Forming Patterned Metal Layer]

Figure 2D:
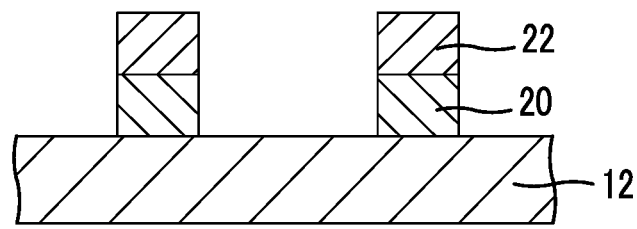

The process 2 is a process of providing metal ions for the patterned plated layer formed during the process 1 and performing a plating treatment on the patterned plated layer for which the metal ions are provided to form a patterned metal layer on the patterned plated layer. As illustrated in FIG. 2D, the patterned metal layer 22 is disposed on the patterned plated layer 20 by performing the present process.

Hereinafter, the description will be made by dividing the process 2 into a process (process 2-1) of providing metal ions for the patterned plated layer and a process (process 2-2) of performing a plating treatment on the patterned plated layer for which the metal ions are provided.

(Process 2-1: Process of Providing Metal Ions)

In the present process, first, metal ions are provided for the patterned plated layer. An interactive group derived from the above-described compound is adhered (adsorbed) to the provided metal ions according to the function thereof. More specifically, metal ions are provided for the inside of the plated layer and the surface of the plated layer.

A metal ion may become a plating catalyst by a chemical reaction. More specifically, a metal ion becomes a 0-valent metal which is a plating catalyst by a reduction reaction. In the present process, the metal ion may be changed into 0-valent metal by a separate reduction reaction to obtain a plating catalyst or the metal ion may be immersed in a plating bath as it is and then changed into a metal (plating catalyst) by a reducing agent in a plating bath after the metal ion is provided for the patterned plated layer and before the metal ion is immersed in a plating bath (for example, an electroless plating bath).

It is preferable that metal ions are provided for the patterned plated layer using a metal salt. The metal salt to be used is not particularly limited as long as the metal salt is dissolved in an appropriate solvent and dissociated into a metal ion and a base (anion), and examples thereof include $M(NO_3)_n$, $MCl_n$, $M_{2/n}(SO_4)$, and $M_{3/n}(PO_4)$ (M represents an n-valent metal atom). As metal ions, the metal ions dissociated from the above-described metal salt can be suitably used. Specific examples thereof include Ag ions, Cu ions, Al ions, Ni ions, Co ions, Fe ions, and Pd ions. Among these, ions capable of being coordinated at multiple sites are preferable and Ag ions and Pd ions are particularly preferable from the viewpoints of the number of types of functional groups capable of being coordinated and the catalytic ability. Among these, from the viewpoint of electrical reliability, Pd ions are particularly preferable.

As the method of providing metal ions for the patterned plated layer, a method of bringing a catalyst-imparting solution including metal ions into contact with the patterned plated layer may be exemplified. Further, as the method of bringing the catalyst-imparting solution into contact with the patterned plated layer, for example, the catalyst-imparting solution may be applied onto the patterned plated layer or a substrate on which the patterned plated layer is formed may be immersed in the catalyst-imparting solution.

The pH of the catalyst-imparting solution is in a range of 3.0 to 7.0 and preferably in a range of 3.2 to 6.8 and more preferably in a range of 3.5 to 6.6 from the viewpoint that the patterned metal layer to be formed is visually recognized to have greater blackness (more specifically, the rear surface side of the patterned metal layer (patterned plated layer side) is visually recognized to have greater blackness when the patterned metal layer is observed from the patterned plated layer side).

In a case where the pH of the catalyst-imparting solution is less than 3.0, the plating deposition during the plating treatment is not sufficient so that the patterned metal layer is not formed. In addition, in a case where the pH of the catalyst-imparting solution exceeds 7.0, a metal layer is deposited on the substrate on which the patterned plated layer is not disposed during the plating treatment and, accordingly, a patterned metal layer in a predetermined shape is not formed. Further, in a case where plating deposition occurs in a region other than the patterned plated layer, the rear surfaces of deposited metal layers are not visually recognized to have blackness.

The catalyst-imparting solution contains metal ions. As the types of metal ions, the above-described metal ions are exemplified.

The catalyst-imparting solution typically contains a solvent. Water or an organic solvent is suitably used as the solvent. As the organic solvent, a solvent capable of permeating into the patterned plated layer is preferable and examples thereof include acetone, methyl acetoacetate, ethyl acetoacetate, ethylene glycol diacetate, cyclohexanone, acetylacetone, acetophenone, 2-(1-cyclohexenyl)cyclohexanone, propylene glycol diacetate, triacetyl, diethylene glycol diacetate, dioxane, N-methylpyrrolidone, dimethyl carbonate, and dimethyl cellosolve.

Further, in a case where water is used as a solvent, water may be an aqueous solution of an acid or an alkali. Examples of the acid contained in an acidic aqueous solution include hydrochloric acid, nitric acid, sulfuric acid, and acetic acid and examples of the alkali contained in an alkaline aqueous solution include sodium hydroxide, potassium hydroxide, and magnesium hydroxide.

The method of adjusting the catalyst-imparting solution is not particularly limited. For example, predetermined metal salts are dissolved in an appropriate solvent and the pH thereof is adjusted to be in a predetermined range using an acid or an alkali as needed.

The concentration of metal ions in a solution is not particularly limited, but preferably in a range of 0.001 to 50% by mass and more preferably in a range of 0.005 to 30% by mass.

Further, the contact time is preferably in a range of 30 seconds to 24 hours and more preferably in a range of 1 minute to 1 hour.

The amount of metal ions to be adsorbed by the plated layer varies depending on the type of plating bath to be used, the type of catalyst metal, the type of interactive group of the patterned plated layer, the usage, or the like, but is preferably in a range of 5 to 1000 mg/m$^2$, more preferably in a range of 10 to 800 mg/m$^2$, and particularly preferably in a range of 20 to 600 mg/m$^2$ from the viewpoint of plating deposition properties.

(Process 2-2: Plating Treatment Process)

Next, the plating treatment is performed on the patterned plated layer for which metal ions are provided.

The method of the plating treatment is not particularly limited, and examples thereof include an electroless plating treatment and an electroplating treatment (electroplating treatment). In the present process, the electroless plating treatment may be performed alone or the electroplating treatment may be further performed after the electroless plating treatment is performed.

Moreover, in the present specification, a so-called silver mirror reaction is included as a type of the above-described electroless plating treatment. Accordingly, adhered metal ions are reduced by the silver mirror reaction or the like so that a desired patterned metal layer may be formed and, thereafter, the electroplating treatment may be performed.

Hereinafter, the procedures of the electroless plating treatment and the electroplating treatment will be described in detail.

The electroless plating treatment indicates an operation of allowing metals to be deposited through a chemical reaction using a solution in which metal ions expected to be deposited as plating are dissolved.

The electroless plating treatment in the present process is carried out by washing the substrate including the patterned plated layer for which metal ions are provided with water, removing extra metal ions, and then immersing the substrate in an electroless plating bath. A known electroless plating bath can be used as the electroless plating bath to be used. In addition, metal ions are reduced and then electroless plating is performed in the electroless plating bath.

Separately from the embodiment of using the above-described electroless plating solution, the reduction of metal ions in the patterned plated layer can be performed by preparing a catalyst activating solution (reducing solution) as a separate process before the electroless plating treatment. The catalyst activating solution is a solution in which a reducing agent that is capable of reducing metal ions to a 0-valent metal is dissolved and the concentration of the reducing agent with respect to the entire solution is preferably in a range of 0.1 to 50% by mass and more preferably in a range of 1 to 30% by mass. As the reducing agent, a boron-based reducing agent such as sodium borohydride or dimethylamine borane or a reducing agent such as formaldehyde or hypophosphorous acid can be used.

During the immersion, it is preferable that the substrate is immersed by adding stirring or shaking thereto.

Typically, the composition of the electroless plating bath mainly includes 1. metal ions for plating, 2. a reducing agent, and 3. an additive (stabilizer) that improves stability of metal ions in addition to a solvent (for example, water). In addition to these, the plating bath may include a known additive such as a stabilizer for a plating bath.

The organic solvent used for the electroless plating bath is required to be a solvent which is soluble in water. From this viewpoint, ketones such as acetone; and alcohols such as methanol, ethanol, and isopropanol are suitably used. As the type of metal used for the electroless plating bath, copper, tin, lead, nickel, gold, silver, palladium, or rhodium is known. Among these, from the viewpoint of conductivity, copper, silver, or gold is preferable and copper is more preferable. Further, an optimal reducing agent and an optimal additive are selected according to the metal.

The time for immersing the substrate in the electroless plating bath is preferably in a range of 1 minute to 6 hours and more preferably in a range of 1 minute to 3 hours.

The electroplating treatment indicates an operation of allowing a metal to be deposited by a current using a solution in which metal ions expected to be deposited as plating are dissolved.

Further, in the present process as described above, the electroplating treatment can be performed after the electroless plating treatment if necessary. According to such an embodiment, the thickness of the patterned metal layer to be formed can be suitably adjusted.

As the method of electroplating, a known method of the related art can be used. Further, examples of metals used for electroplating include copper, chromium, lead, nickel, gold, silver, tin, and zinc. Among these, from the viewpoint of conductivity, copper, gold, or silver is preferable and copper is more preferable.

In addition, the film thickness of the patterned metal layer obtained by the electroplating can be controlled by adjusting the concentration of a metal contained in the plating bath or the current density.

The thickness of the patterned metal layer to be formed by the above-described procedures is not particularly limited and the optimal thickness can be suitably selected according to the intended use, but preferably 0.1 µm or greater, more preferably 0.5 µm or greater, and still more preferably in a range of 1 to 30 µm, from the viewpoint of conductivity.

Moreover, the type of metal constituting the patterned metal layer is not particularly limited and examples thereof include copper, chromium, lead, nickel, gold, silver, tin, and zinc. Among these, from the viewpoint of conductivity, copper, gold, or silver is preferable and copper or silver is more preferable.

The pattern shape of the patterned metal layer is not particularly limited, but the patterned metal layer may have a mesh pattern because the patterned metal layer is disposed on the patterned plated layer, that is, the patterned metal layer is disposed along the shape of the patterned plated layer so that the shape thereof is adjusted by the pattern shape of the patterned plated layer. The patterned metal layer having a mesh pattern can be suitably applied as a sensor electrode in a touch panel. In a case where the pattern shape of the patterned metal layer is a mesh pattern, the range of the length W of one side of the lattice (opening portion) in the mesh pattern, the preferred embodiment of the lattice shape, and the line width of the patterned metal layer are the same as those of the above-described patterned plated layer.

Moreover, the patterned plated layer after the above-described treatment is performed contains metal particles generated by the reduction of the metal ions. The metal particles are dispersed in the patterned plated layer at a high density. Further, as described above, the interface between the patterned plated layer and the patterned metal layer has a complicated shape. Due to the influence of the interface shape, the patterned metal layer is visually recognized to have greater blackness.

In the present invention, a covering layer may be provided on the formed patterned metal layer. Particularly in a case where the patterned metal layer has a layer configuration in which the surface thereof is directly viewed, an effect of reducing metallic luster of the patterned metal layer or an effect of making the copper color unnoticeable is obtained by making the surface of the patterned metal layer black (blackening). In addition to these effects, an anticorrosive effect and a migration preventing effect are also obtained.

As the blackening method, a lamination method or a substitution method may be used. As the lamination method, a method of laminating a covering layer (blackening layer) using plating known as blackening plating may be used, and NIKKA BLACK (manufactured by NIHON KAGAKU SANGYO CO., LTD.) or EBONY CHROMIUM 85 SERIES (manufactured by Metal Finishing Laboratory Co., Ltd.) can be used. Further, as the substitution method, a method of preparing a covering layer (blackened layer) by sulfurizing or oxidizing the surface of the patterned metal layer or a method of preparing a covering layer (blackened layer) by substituting the surface of the patterned metal layer with a nobler metal may be exemplified. As a sulfurization method, ENPLATE MB438A (manufactured by Meltex Inc.) may be used. As an oxidation method, PROBOND80 (Rohm and Haas Electronic Materials K.K.) may be used. As the substitution plating with respect to a noble metal, palladium can be used.

<Laminate>

When the above-described processes are performed, a conductive laminate including a substrate having two main surfaces; a patterned plated layer disposed on at least one main surface of the substrate; and a patterned metal layer which is disposed on the patterned plated layer and contains a metal component (configured of a metal component) is formed. The conductive laminate functions as a so-called transparent conductive laminate and can be suitably used for other applications (display applications) other than touch panel applications.

In addition, the patterned plated layer includes an interactive group. As an embodiment thereof, the patterned plated layer is formed by providing energy for the composition for forming a plated layer in a pattern shape as described above. Further, as an embodiment of the patterned metal layer, the patterned metal layer is formed by carrying out the plating treatment.

In the conductive laminate, the patterned plated layer and the patterned metal layer may be disposed only one main surface of the substrate or the patterned plated layer and the patterned metal layer may be disposed on two both main surfaces of the substrate. In addition, in a case where the patterned plated layer and the patterned metal layer are disposed on both surfaces of the substrate, the process 1 and the process 2 may be performed on both surfaces of the substrate.

As described above, in the conductive laminate of the present invention, the patterned plated layer contains a metal component constituting the patterned metal layer. For example, in a case where the patterned metal layer is a copper-plated layer (metal layer made of copper), the patterned plated layer contains copper components.

Further, in the conductive laminate of the present invention, the ratio of the average peak intensity resulting from the metal component contained in the patterned plated layer to the average peak intensity resulting from the metal component constituting the patterned metal layer is in a range of 0.5 to 0.95 (preferably in a range of 0.65 to 0.95 and more preferably in a range of 0.8 to 0.95) when the cross sections of the patterned plated layer and the patterned metal layer are compositionally analyzed using an energy-dispersive X-ray spectroscopy method (EDS method).

More specifically, the cut cross sections of both of the patterned plated layer and the patterned metal layer are compositionally analyzed along a normal direction of the substrate of the conductive laminate using an energy-dispersive X-ray spectroscopy method. A peak resulting from the metal component constituting the patterned metal layer is observed from the region of the patterned metal layer. For example, in a case where the patterned metal layer is a copper layer, a peak derived from copper is observed. Further, as described above, the patterned plated layer includes the same metal component as that of the patterned metal layer. Accordingly, a peak derived from the metal component being contained is observed from the region of the patterned plated layer.

Next, average peak intensity Pa derived from the metal component constituting the patterned metal layer and average peak intensity Pb derived from the metal component contained in the patterned plated layer are respectively calculated and the ratio (Pb/Pa) of the average peak intensity Pb to the average peak intensity Pa is calculated. When the obtained ratio (Pb/Pa) is in the above-described range, the amount of metal component contained in the patterned plated layer is a predetermined amount and desired effects are obtained.

According to the method of calculating the average peak intensity Pa, the compositional analysis is performed on the cross section of the patterned metal layer obtained by the above-described method along the depth direction using an energy-dispersive X-ray spectroscopy method, peak intensities of arbitrary 10 or more sites are respectively calculated, and then the values are arithmetically averaged, thereby obtaining the average peak intensity Pa.

Further, similar to the method of calculating the average peak intensity Pb, the compositional analysis is performed on the cross section of the patterned metal layer obtained by the above-described method along the depth direction using an energy-dispersive X-ray spectroscopy method, peak intensities of arbitrary 10 or more sites are respectively calculated, and then the values are arithmetically averaged, thereby obtaining the average peak intensity Pb.

The total light transmittance of the conductive laminate in conformity with JIS K7361-1 is not particularly limited, but is preferably 75% or greater and more preferably 80% or greater from the viewpoint that visibility is more excellent when the conductive laminate is used for a touch panel application. The upper limit thereof is not particularly limited, but typically 98% or less in many cases.

Further, the total light transmittance can be evaluated by NDH7000 (manufactured by NIPPON DENSHOKU INDUSTRIES Co., LTD.).

It is preferable that the conductive laminate obtained by the above-described treatment satisfies at least one of the following Requirements X and Y.

Requirement X: Metal particles having an average particle diameter of 10 to 1000 nm are present on a surface layer region over 500 nm in a direction from the interface between the patterned plated layer and the patterned metal layer to the patterned plated layer side.

Requirement Y: The interface between the patterned plated layer and the patterned metal layer has an uneven shape, the arithmetic average roughness Ra of the uneven shape is in a range of 5 to 1000 nm, and the average distance between concave portions in the uneven shape is in a range of 10 to 1000 nm.

In addition, since the definitions of the above-described Requirements X and Y are the same as those of Requirements A and B of the second embodiment described below except the type of layer to be used, the details thereof will be described later.

The obtained conductive laminate can be suitably used for a touch panel (preferably, an electrostatic capacitance touch panel). More specifically, the conductive laminate can be used as a member constituting a touch sensor in a touch panel and the patterned metal layer can be suitably used for a sensor electrode sensing a change in electrostatic capacitance or a lead-out wiring (peripheral wiring) for applying a voltage to the sensor electrode.

When the conductive laminate is used for a touch panel, an overcoat layer or an OCA layer may be adjacent thereto, and linear alkyl dicarboxylic acid such as undecanedioic acid, dodecanedioic acid, or tridecanedioic acid; a phosphate compound such as monomethyl phosphate or monoethyl phosphate; a pyridine-based compound such as a quinaldic acid; a triazole-based compound such as triazole, carboxybenzotriazole, benzotriazole, or naphtholtriazole; tetrazoles such as 1H-tetrazole; a tetrazole-based compound such as benzotetrazole; a bisphenol-based compound such as 4,4'-butylidenebis-(6-tert-butyl-3-methylphenol); a hindered phenolic compound such as pentaerythrityl-tetrakis [3-(3,5-di-t-butyl-4-hydroxyphenyl)propionate]; a salicylic acid derivative; a hydrazide derivative; aromatic phosphate; thioureas; tolutriazole; or a compound having a mercapto group such as 2-mercapto oxazole thiol, methyl benzothiazole, or mercaptothiazoline; or a triazine ring compound may be added to these adjacent layers for the purpose of preventing rust of copper.

Further, a cyclic compound such as crown ether or a cyclic phosphorus compound may be added to those adjacent layers.

Further, an anionic surfactant such as alkylbenzene sulfonate, linear alkylbenzene sulfonate, naphthalene sulfonate, or alkenyl succinate; a water-soluble polymer having properties as a Lewis base such as PVP; or a sulfonic acid group-containing polymer such as an arylsulfonic acid/salt polymer, polystyrene sulfonic acid, polyallyl sulfonic acid, polymethallyl sulfonic acid, polyvinyl sulfonic acid, polyisoprene sulfonic acid, a 3-sulfopropyl acrylate homopolymer, a 3-sulfopropyl methacrylate homopolymer, or a 2-hydroxy-3-acrylamidpropanesulfonic acid homopolymer may be added to those adjacent layers.

Moreover, a metal chelate compound such as an antimony pentoxide hydrate, an aluminum coupling agent, or a zirconium alkoxide; a zinc compound, an aluminum compound, a barium compound, a strontium compound, or a calcium compound may be added to those adjacent layers. Examples of the zinc compound include zinc phosphate, zinc molybdate, zinc borate, and zinc oxide. Examples of the aluminum compound include aluminum dihydrogen tripolyphosphoric acid and aluminum phosphomolybdic acid. Examples of the barium compound include barium metaborate. Examples of strontium compound include strontium carbonate, strontium oxide, strontium acetate, strontium metaborate, and metal strontium. Examples of the calcium compound include calcium phosphate and calcium molybdate.

In addition, an oxidant such as ammonium persulfate, potassium persulfate, or hydrogen peroxide may be added to those adjacent layers.

In addition, a combination of dichloroisocyanurate and sodium metasilicate pentahydrate may be added to those adjacent layers.

In addition, a known corrosion inhibitor of copper can be used. Further, these compounds may be used in combination of two or more kinds thereof.

Figure 3:
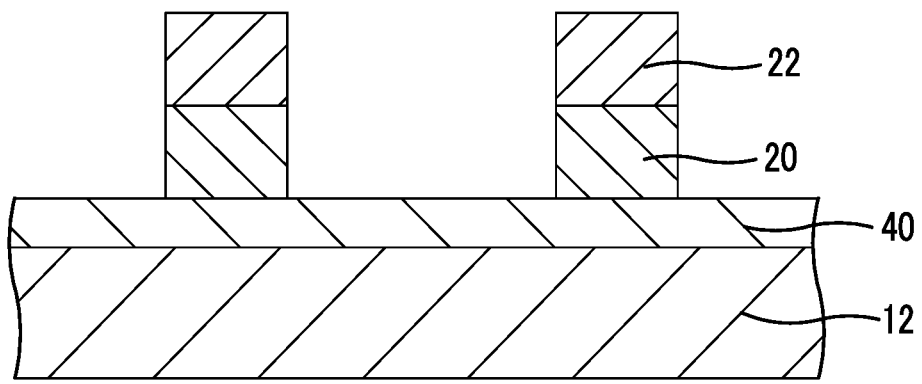
FIG. 3 is a cross-sectional view of a conductive laminate for a touch panel according to a modification example of the first embodiment of the present invention.

According to a modification example of the first embodiment, a primer layer may be further provided on the substrate. More specifically, as illustrated in FIG. 3, a primer layer 40 may be adjacently disposed on the substrate 12. When the primer layer is disposed between the substrate and the patterned plated layer, the adhesiveness therebetween is more improved.

The thickness of the primer layer is not particularly limited, but is preferably in a range of 0.01 to 100 µm, more preferably in a range of 0.05 to 20 µm, and still more preferably in a range of 0.05 to 10 µm.

The material of the primer layer is not particularly limited, but a resin having excellent adhesiveness to the substrate is preferable. Specific examples of the resin may be a thermosetting resin or a thermoplastic resin or a mixture of these. Examples of the thermosetting resin include an epoxy resin, a phenolic resin, a polyimide resin, a polyester resin, a bismaleimide resin, a polyolefin-based resin, and an isocyanate-based resin and examples of the thermoplastic resin include a phenoxy resin, polyether sulfone, polysulfone, polyphenylene sulfone, polyphenylene sulfide, polyphenyl ether, polyether imide, and an ABS resin.

The thermoplastic resin or the thermosetting resin may be respectively used alone or in combination of two or more kinds thereof. Further, a resin containing a cyano group may be used. Specifically, an ABS resin or "a polymer including a unit that has a cyano group in the side chain" described in paragraphs [0039] to [0063] of JP2010-84196A may be used.

Moreover, rubber components such as acrylonitrile butadiene rubber (NBR rubber) and styrene butadiene rubber (SBR rubber) can be used.

According to a preferred embodiment of the material constituting the primer layer, a polymer having a conjugated diene compound unit which may be hydrogenated may be exemplified. The conjugated diene compound unit indicates a repeating unit derived from a conjugated diene compound. The conjugated diene compound is not particularly limited as long as the compound is separated by one single bond and has a molecular structure having two carbon-carbon double bonds.

As one preferred embodiment of the repeating unit derived from the conjugated diene compound, a repeating unit generated by a polymerization reaction of a compound having a butadiene skeleton may be exemplified.

The conjugated diene compound unit may be hydrogenated, and adhesiveness of the patterned metal layer is further improved in a case where the patterned metal layer includes a hydrogenated conjugated diene compound unit. That is, a double bond in the repeating unit derived from the conjugated diene compound may be hydrogenated.

A polymer having the conjugated diene compound unit which may be hydrogenated may include the above-described interactive group.

Examples of the preferred embodiment of this polymer include acrylonitrile butadiene rubber (NBR), carboxyl group-containing nitrile rubber (XNBR), acrylonitrile-butadiene-isoprene rubber (NBIR), an acrylonitrile-butadiene-styrene copolymer (ABS resin), and hydrogenated products of these (for example, hydrogenated acrylonitrile butadiene rubber).

The primer layer may include other additives (such as, a sensitizer, an antioxidant, an antistatic agent, an ultraviolet absorbent, a filler, particles, a flame retardant, a surfactant, a lubricant, and a plasticizer).

The method of forming a primer layer is not particularly limited, and examples thereof include a method of laminating a resin to be used on the substrate and a method of dissolving necessary components in a solvent which is capable of dissolving the components, coating the surface of the substrate with the solvent according to a coating method or the like, and drying the surface thereof.

The heating temperature and the heating time according to the coating method are selected depending on conditions in which a solvent to be applied can be sufficiently dried, and it is preferable that heating conditions of a heating temperature of 200° C. or lower within 60 minutes are selected and more preferable that heating conditions of a heating temperature of 40° C. to 100° C. within 20 minutes are selected from the viewpoint of production suitability. In addition, as the solvent to be used, an optimal solvent (for example, cyclohexanone or methyl ethyl ketone) suitable for a resin to be used is selected.

In a case where a substrate on which the primer layer is disposed is used, a desired conductive laminate is obtained by performing the process 1 and the process 2 described above on the primer layer.

Second Embodiment

As the second embodiment of the conductive laminate for a touch panel of the present invention, a conductive laminate for a touch panel including a substrate which has two main surfaces; a patterned resin layer which is disposed on at least one main surface of the substrate; and a patterned metal layer which is disposed on the patterned resin layer, in this order, in which at least one of the following Requirement A or Requirement B is satisfied may be exemplified.

Requirement A: Metal particles having an average particle diameter of 10 to 1000 nm are present on a surface layer region over 500 nm in a direction from the interface between the patterned resin layer and the patterned metal layer to the patterned resin layer side.

Requirement B: The interface between the patterned resin layer and the patterned metal layer has an uneven shape, the arithmetic average roughness Ra of the uneven shape is in a range of 5 to 1000 nm, and the average distance between concave portions in the uneven shape is in a range of 10 to 1000 nm.

When the conductive laminate for a touch panel having the above-described configuration is used, desired effects can be obtained.

The substrate of the conductive laminate for a touch panel according to the second embodiment is the same as the substrate of the first embodiment described above, and the description thereof will not be repeated.

The type of resin constituting the patterned resin layer of the conductive laminate for a touch panel according to the second embodiment is not particularly limited, and a known resin may be used and the resin may be a thermosetting resin or a thermoplastic resin or a mixture of these. Examples of the thermosetting resin and the thermoplastic resin are the same as those of the thermosetting resin and the thermoplastic resin used for the primer layer of the first embodiment described above.

In addition, as a preferred embodiment of the resin to be used for forming the patterned resin layer, a resin to be formed by providing energy for a compound having the interactive group and the polymerizable group described above or a polymer having a conjugated diene compound unit which may be hydrogenated may be exemplified. The definitions of the compound having an interactive group and a polymerizable group and a polymer having a conjugated diene compound unit which may be hydrogenated are the same as described above.

The type of metal constituting the patterned metal layer is not particularly limited and examples thereof include copper, chromium, lead, nickel, gold, silver, tin, and zinc. Among these, from the viewpoint of conductivity, copper, gold, or silver is preferable and copper or silver is more preferable.

The pattern shape of the patterned metal layer is not particularly limited, but a mesh pattern or the like may be exemplified. In a case where the pattern shape of the patterned metal layer is a mesh pattern, the range of the length W of one side of the lattice (opening portion) in the mesh pattern, the preferred embodiment of the lattice shape, and the line width of the patterned metal layer are the same as those of the above-described patterned plated layer.

The conductive laminate for a touch panel of the present embodiment satisfies at least one of the following Requirements A and B.

Requirement A: Metal particles having an average particle diameter of 10 to 1000 nm are present on a surface layer region over 500 nm in a direction from the interface between the patterned resin layer and the patterned metal layer to the patterned resin layer side.

Requirement B: The interface between the patterned resin layer and the patterned metal layer has an uneven shape, the arithmetic average roughness Ra of the uneven shape is in a range of 5 to 1000 nm, and the average distance between concave portions in the uneven shape is in a range of 10 to 1000 nm.

In the above-described Requirement A, when the surface layer region (that is, the surface layer region in a direction from the surface of the patterned resin layer on the patterned metal layer side to the patterned resin layer side) in a direction from the interface between the patterned resin layer and the patterned metal layer to the patterned resin layer side contains metal particles having a predetermined size, light entering from the substrate side is absorbed by surface plasmon resonance of metal particles thereof and thus the patterned metal layer is visually recognized to have greater blackness.

The average particle diameter of the metal particles is in a range of 10 to 1000 nm, and is preferably in a range of 15 to 900 nm and more preferably in a range of 20 to 800 nm from the viewpoint that the patterned metal layer is visually recognized to have greater blackness.

Further, the average particle diameter is an average value of primary particle diameters of metal particles and is a value obtained by measuring diameters of arbitrary 10 or more metal particles using an electron microscope and arithmetically averaging those values. In a case where the shape of the metal particles is not a perfect circle, the long diameter is set to the diameter.

Moreover, when the metal particles are observed, the cross section of the conductive laminate (cross section vertical to the surface of the substrate of the conductive laminate) is observed by an electron microscope (for example, SEM observation), and it is confirmed whether metal particles having a predetermined size are included in the surface layer region over 500 nm in the direction from the interface (boundary line) between the patterned resin layer and the patterned metal layer to the patterned resin layer side.

Moreover, the surface layer region indicates a region over 500 nm in the direction from the interface between the patterned resin layer and the patterned metal layer to the patterned resin layer side in a case where the thickness of the patterned resin layer exceeds 500 nm, and the surface layer region indicates the entire patterned resin layer in a case where the thickness of the patterned resin layer is 500 nm or less.

In the Requirement B, when the interface between the patterned resin layer and the patterned metal layer has a predetermined uneven shape (uneven surface), reflection of light entering from the substrate side is prevented by the uneven shape and, accordingly, the patterned metal layer is visually recognized to have greater blackness.

The arithmetic average roughness Ra of the uneven shape of the interface between the patterned resin layer and the patterned metal layer is in a range of 5 to 1000 nm, preferably in a range of 10 to 900 nm, and more preferably in a range of 15 to 800 nm from the viewpoint that the patterned metal layer is visually recognized to have greater blackness.

According to the method of measuring the arithmetic average roughness Ra, the cross section (cross section vertical to the surface of the substrate of the conductive laminate) of the conductive laminate is observed by an electron microscope (for example, SEM observation), and the arithmetic average roughness Ra of the interface (boundary line) between the patterned resin layer and the patterned metal layer can be acquired. More specifically, the arithmetic average roughness Ra of the interface is defined as a value acquired by imaging the interface between the patterned resin layer and the patterned metal layer using an electron microscope, tracing the uneven shape of the interface in the photograph, and regarding the trace as the surface shape in conformity with the method of calculating an arithmetic average roughness (Ra) regulated by JIS B 0601-2001 (ISO4287-1997).

Further, the average distance between concave portions in the uneven shape is in a range of 10 to 1000 nm From the viewpoint that the patterned metal layer is visually recognized to have greater blackness, the average distance thereof is preferably in a range of 15 to 900 nm and more preferably in a range of 20 to 800 nm.

The concave portion corresponds to a portion formed by the metal of the patterned metal layer having entered the inside of the patterned resin layer. In other words, the concave portion may be referred to as a convex portion protruding to the substrate side of the patterned metal layer.

The average distance between the concave portions indicates the average value of distances between concave portions adjacent to each other and is a value obtained by measuring the distances between at least 10 sets of concave portions adjacent to each other and arithmetically averaging the distances. Further, as the method of measuring the distance between the concave portions, similar to the above-described arithmetic average roughness Ra, a method of observing the cross section vertical to the surface of the substrate of the conductive laminate using an electron microscope (for example, SEM observation) and observing the interface (boundary line) between the patterned resin layer and the patterned metal layer may be exemplified.

The method of producing the conductive laminate for a touch panel according to the second embodiment is not particularly limited as long as the above-described structure can be formed, and, for example, the production methods of the first embodiment and the second embodiment described above may be performed in a case where a compound having an interactive group and a polymerizable group is used when the patterned resin layer is formed.

As other production methods, a method of forming a patterned metal layer by performing a roughening treatment on the surface of a patterned resin layer and then carrying out a dry process such as sputtering or the like and a wet process such as the above-described plating treatment or the like may be exemplified.

The total light transmittance of the conductive laminate of the second embodiment is not particularly limited, and the preferable ranges are the same as the preferable ranges of the total light transmittance of the conductive laminate of the first embodiment described above.

Further, similar to the first embodiment, the primer layer may be adjacently disposed on the substrate.

EXAMPLES

Hereinafter, the present invention will be described in more detail with reference to examples, but the present invention is not limited thereto.

Synthesis Example 1: Polymer 1

1 L of ethyl acetate and 159 g of 2-aminoethanol were added to a 2 L three-necked flask and cooled in an ice bath. 150 g of 2-bromoisobutyrate bromide was adjusted such that the internal temperature thereof became 20° C. or lower and was added dropwise thereto. Thereafter, the internal temperature was increased to room temperature (25° C.) to cause a reaction for 2 hours. After the reaction was finished, 300 mL of distilled water was added thereto to stop the reaction. Next, an ethyl acetate phase was washed with 300 mL of distilled water four times and dried over magnesium sulfate, and ethyl acetate was distilled off, thereby obtaining 80 g of a raw material A.

Subsequently, 47.4 g of the raw material A, 22 g of pyridine, and 150 mL of ethyl acetate were added to a 500 mL three-necked flask and cooled in an ice bath. 25 g of acrylic acid chloride was adjusted such that the internal temperature thereof became 20° C. or lower and was added dropwise thereto. Thereafter, the internal temperature was increased to room temperature to cause a reaction for 3 hours. After the reaction was finished, 300 mL of distilled water was added thereto to stop the reaction. Next, an ethyl acetate phase was washed with 300 mL of distilled water four times and dried over magnesium sulfate, and ethyl acetate was distilled off, thereby obtaining the following monomer M1 (20 g) using column chromatography.

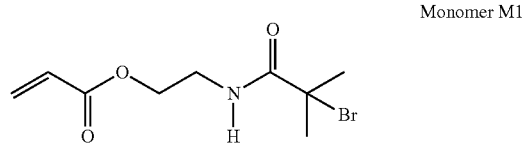

Monomer M1

8 g of N,N-dimethylacetamide was added to a 500 mL three-necked flask and heated to 65° C. in a nitrogen stream. A solution having 8 g of N,N-dimethylacetamide with 14.3 g of the monomer M1, 3.0 g of acrylonitrile (manufactured by Tokyo Chemical Industry Co., Ltd.), 6.5 g of acrylic acid (manufactured by Tokyo Chemical Industry Co., Ltd.), and 0.4 g of V-65 (manufactured by Wako Pure chemical Industries, Ltd.) was added dropwise thereto for 4 hours.

After the dropwise addition was finished, the reaction solution was stirred for 3 hours. Thereafter, 41 g of N,N-dimethylacetamide was added thereto and the reaction temperature was cooled to room temperature. 0.09 g of 4-hydroxy TEMPO (manufactured by Tokyo Chemical Industry Co., Ltd.) and 54.8 g of diazabicycloundecene (DBU) were added to the reaction solution to cause a reaction at room temperature for 12 hours. Subsequently, 54 g of a 70 mass % methanesulfonic acid aqueous solution was added to the reaction solution. After the reaction was finished, re-precipitation was carried out with water, and a solid content was extracted, thereby obtaining 12 g of a polymer 1.

The obtained polymer 1 was identified using an IR measuring machine (manufactured by Horiba, Ltd.). The measurement was performed by dissolving the polymer in acetone using KBr crystals. As the result of IR measurement, it was found that a peak was observed in the vicinity of 2240 $cm^{-1}$ and acrylonitrile serving as a nitrile unit was introduced into the polymer. Further, as a result of acid value measurement, it was found that acrylic acid was introduced as a carboxylic acid unit. In addition, the acrylic acid was dissolved in heavy dimethyl sulfoxide (DMSO) and measurement was carried out using NMR (AV-300) of 300 MHz (manufactured by Bruker Corporation). A peak corresponding to the nitrile group-containing unit was broadly observed at 2.5 to 0.7 ppm (5H), a peak corresponding to the polymerizable group-containing unit was broadly observed at 7.8 to 8.1 ppm (1H), 5.8 to 5.6 ppm (1H), 5.4 to 5.2 ppm (1H), 4.2 to 3.9 ppm (2H), 3.3 to 3.5 ppm (2H), and 2.5 to 0.7 ppm (6H), and a peak corresponding to the carboxylic acid-containing unit was broadly observed at 2.5 to 0.7 ppm (3H). Further, it was understood that the ratio of the polymerizable group-containing unit:the nitrile group-containing unit:the carboxylic acid group unit was 30:30:40 (% by mole).

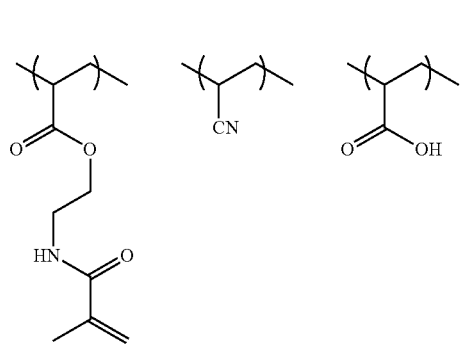

Polymer 1

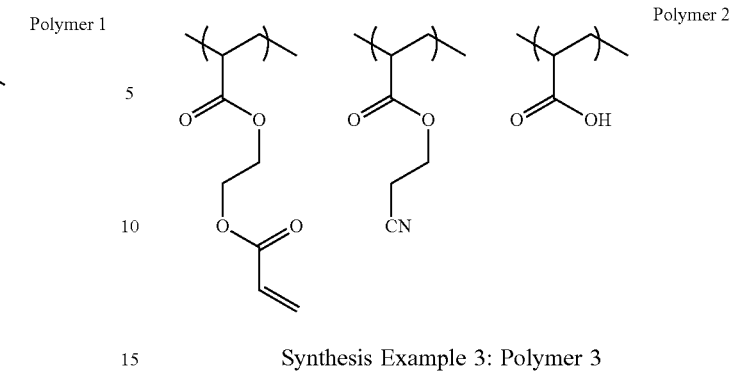

Polymer 2

Synthesis Example 3: Polymer 3

200 g of N,N-dimethylacetamide, 30 g of polyacrylic acid (manufactured by Wako Pure chemical Industries, Ltd., molecular weight: 25000), 2.4 g of tetraethyl ammonium benzyl chloride, 25 mg of di-tertiary pentyl hydroquinone, and 27 g of CYCLOMER A (manufactured by Daicel Corporation) were added to a 500 mL three-necked flask to cause a reaction at 100° C. for 5 hours in a nitrogen stream. Thereafter, the reaction solution was re-precipitated and a solid content was extracted, thereby obtaining a polymer 3 (28 g).

Synthesis Example 2: Polymer 2

20 g of N,N-dimethylacetamide was added to a 500 mL three-necked flask and heated to 65° C. in a nitrogen stream. A solution having 20 g of N,N-dimethylacetamide with 20.7 g of the monomer M2, 20.5 g of 2-cyanoethyl acrylate (manufactured by Tokyo Chemical Industry Co., Ltd.), 14.4 g of acrylic acid (manufactured by Tokyo Chemical Industry Co., Ltd.), and 1.0 g of V-65 (manufactured by Wako Pure chemical Industries, Ltd.) was added dropwise thereto for 4 hours. After the dropwise addition was finished, the reaction solution was stirred for 3 hours. Thereafter, 91 g of N,N-dimethylacetamide was added thereto and the reaction temperature was cooled to room temperature.

0.17 g of 4-hydroxy TEMPO (manufactured by Tokyo Chemical Industry Co., Ltd.) and 75.9 g of triethylamine were added to the reaction solution to cause a reaction at room temperature for 4 hours. Subsequently, 112 g of a 70 mass % methanesulfonic acid aqueous solution was added to the reaction solution. After the reaction was finished, re-precipitation was carried out with water, and a solid content was extracted, thereby obtaining 25 g of a polymer 2.

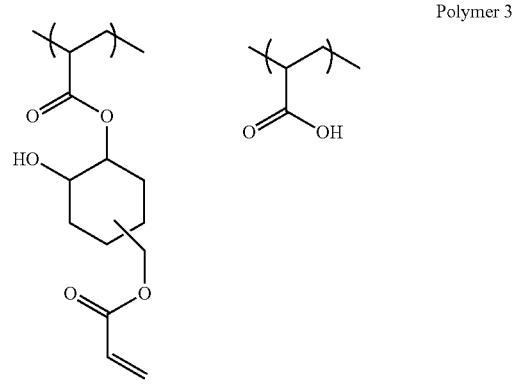

Polymer 3

Preparation of Composition for Forming Plated Layer

Water, propylene glycol monomethyl ether, 2-acrylamido-2-methylpropanesulfonic acid, 6-acrylamidohexanoic acid, the polymers 1 to 3, hexamethylene bisacrylamide, and IGRACUREOXE 02 (manufactured by BASF) were added, according to the compositions of Table 1, to a 200 mL beaker to which a magnetic stirrer was added to prepare a liquid, thereby obtaining compositions 1 to 6.

Further, in Table 1, the content of each component is represented by the unit of % by mass with respect to the total amount of the compositions.

Monomer M2

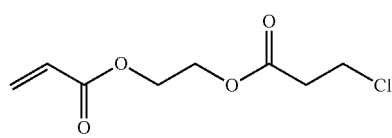

TABLE 1

| | | Composition 1 | Composition 2 | Composition 3 | Composition 4 | Composition 5 | Composition 6 |
|---|---|---|---|---|---|---|---|
| Solvent | Water | 18.95 | 18.95 | 18.95 | 18.95 | 18.95 | 18.95 |
| | Propylene glycol monomethyl ether | 75.8 | 75.8 | 75.8 | 75.8 | 75.8 | 75.8 |
| Polymer having interactive group and polymerizable group | Type | Polymer 1 | Polymer 2 | Polymer 3 | — | — | Polymer 1 |
| | Addition amount | 5 | 5 | 5 | — | — | 2.5 |

TABLE 1-continued

|  |  | Composition 1 | Composition 2 | Composition 3 | Composition 4 | Composition 5 | Composition 6 |
|---|---|---|---|---|---|---|---|
| Monomer having interactive group and polymerizable group | Type | — | — | — | 2-acrylamido-2-methyl-propane-sulfonic acid | 6-acrylamido-hexanonic acid | 2-acrylamido-2-methyl-propane-sulfonic acid |
|  | Addition amount | — | — | — | 2.5 | 2.5 | 1.25 |
| Polyfunctional monomer | Hexamethylene bisacrylamide | — | — | — | 2.5 | 2.5 | 1.25 |
| Polymerization initiator | IRGACURE OXE02 | 0.25 | 0.25 | 0.25 | 0.25 | 0.25 | 0.25 |

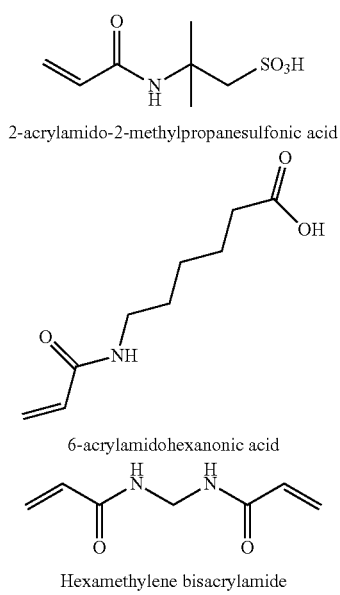

<Composition for Forming Primer Layer>

A solution obtained by dissolving 100 g of hydrogenated nitrile butadiene rubber Zetpole 0020 (manufactured by Zeon Corporation) in 900 g of cyclopentanone (manufactured by Tokyo Chemical Industry Co., Ltd.) was set as a composition for forming a primer layer.

Examples 1 to 10 and Comparative Examples 1 to 3

Preparation of Substrates S1-1 to S1-6 Provided with Plated Layer

After glass substrate GORILLA GLASS (manufactured by Corning Inc.) was heated and dried at 150° C. for 1 hour, the glass was subsequently spin-coated with hexamethyldisilazane (manufactured by manufactured by Tokyo Chemical Industry Co., Ltd.) and a composition for forming a primer layer at 1500 rmp for 1 minute and dried at 80° C. for 5 minutes, thereby obtaining a glass substrate provided with a primer layer. Next, the primer layer was spin-coated with each of the compositions (compositions 1 to 6) for forming a plated layer listed in Table 1 at 1500 rpm for 1 minute and dried at 80° C. for 5 minutes. Thereafter, the substrate was irradiated with UV rays (amount of energy: 2 J, 10 mW, wavelength: 256 nm) in the atmosphere through a negative type mask having a line/space pattern of 2 μm/98 μm and developed using 1% sodium hydrogen carbonate, thereby forming a pattern plated layer. The substrates provided with a plated layer obtained here were respectively set as substrates S1-1 to S1-6 provided with a plated layer.

Preparation of Substrate S1-7 Provided with Plated Layer

A substrate S1-7 provided with a plated layer was prepared by following the same procedures as the procedures for preparing the substrate S1-1 provided with a plated layer except that a mask having a pattern of 5 μm/95 μm was used in place of the mask having a pattern of 2 μm/98 μm.

Preparation of Substrate S1-8 Provided with Plated Layer

A substrate S1-8 provided with a plated layer was prepared by following the same procedures as the procedures for preparing the substrate S1-1 provided with a plated layer except that a mask having a pattern of 10 μm/90 μm was used in place of the mask having a pattern of 2 μm/98 μm.

Preparation of Substrate S1-9 Provided with Plated Layer

A substrate S1-9 provided with a plated layer was prepared by following the same procedures as the procedures for preparing the substrate S1-1 provided with a plated layer except that the substrate was spin-coated with hexamethyldisilazane and then spin-coated with the composition for a plated layer without using the composition for forming a primer layer.

Preparation of Substrate S1-10 Provided with Plated Layer

A substrate S1-10 provided with a plated layer was prepared by following the same procedures as the procedures for preparing the substrate S1-1 provided with a plated layer except that a polyethylene terephthalate (PET) substrate A4300 (manufactured by TOYOBO CO., LTD.) was used in place of the glass substrate and directly spin-coated with the composition for forming a primer layer at 1500 rpm for 1 minute without using hexamethyldisilazane.

The thickness of the patterned plated layers of the substrates S1-1 to S1-10 provided with a plated layer was 1.0 μm.

Examples 1 to 10

Preparation of Conductive Laminates E1-1 to E1-10 Comprising Patterned Copper Layer The surfaces of the substrates S1-1 to S1-10 provided with a plated layer, on which a plated layer was not formed, were masked with curing tape (manufactured by Nitto Denko Corporation), immersed in a Pd catalyst-imparting solution MAT-2 (manufactured by Uyemura CO., LTD.) obtained by diluting only MAT-2A to 5 times at room temperature for 5 minutes, and washed with pure water two times. Next, the substrates were immersed in a reducing agent MAB (manufactured by Uyemura CO., LTD.) at 36° C. for 5 minutes and washed with pure water for 2 times. Subsequently, the substrates were immersed in an activating treatment solution MEL-3 (manufactured by Uyemura CO., LTD.) at room temperature for 5 minutes and immersed in an electroless plating solution THRU-CUP PEA (manufactured by Uyemura CO., LTD.) at room temperature for 60 minutes without being washed. Substrates respectively comprising a patterned plated layer and a patterned copper layer obtained by peeling the masked tape therefrom and washing with pure water two times were set as conductive laminates E1-1 to E1-10.

Moreover, the "Pd catalyst-imparting solution MAT-2 (manufactured by Uyemura CO., LTD.) obtained by diluting only MAT-2A to 5 times" corresponds to a catalyst-imparting solution containing palladium ions and the pH thereof was 3.5.

Examples 11 and 12

Preparation of Conductive Laminates E1-11 and E1-12 Comprising Patterned Copper Layer After 200 mL of 10% hydrochloric acid was added to palladium chloride (0.5 g) so that the palladium chloride was dissolved therein, 700 mL of a 1N sodium hydroxide aqueous solution was added thereto. A catalyst-imparting solution X obtained by adjusting the pH of the Pd catalyst-imparting solution to 4.4 in 10% hydrochloric acid and a 1N sodium hydroxide aqueous solution and a catalyst-imparting solution Y obtained by adjusting the pH of the Pd catalyst-imparting solution to 6.6 were respectively prepared.

A conductive laminate E1-11 was prepared by following the same procedures as the procedures for the method of preparing the conductive laminate E1-1 except that the catalyst-imparting solution X was used in place of the "Pd catalyst-imparting solution MAT-2 (manufactured by Uyemura CO., LTD.) obtained by diluting only MAT-2A to 5 times".

Further, a conductive laminate E1-12 was prepared by following the same procedures as the procedures for the method of preparing the conductive laminate E1-1 except that the catalyst-imparting solution Y was used in place of the "Pd catalyst-imparting solution MAT-2 (manufactured by Uyemura CO., LTD.) obtained by diluting only MAT-2A to 5 times".

Comparative Example 1

A substrate S1-13 provided with a plated layer comprising a patterned plated layer (corresponding to a resist) was obtained by following the same procedures as the procedures described in paragraphs [0034] to [0037] of JP1999-170421A (JP-H11-170421A) except that the substrate provided with a primer layer was used in place of an "acrylic resin substrate having a thickness of 2 mm and an area of 100 mm$^2$".

Moreover, in Comparative Example 1, a resist coating solution containing palladium colloid as a plating catalyst was used as described in JP1999-170421A (JP-H11-170421A).

The surface of the substrate S1-13 provided with a plated layer, on which a plated layer was not formed, was masked with curing tape (manufactured by Nitto Denko Corporation), immersed in an activating treatment solution MEL-3 (manufactured by Uyemura CO., LTD.) at room temperature for 5 minutes, and immersed in an electroless plating solution THRU-CUP PEA (manufactured by Uyemura CO., LTD.) at room temperature for 60 minutes without being washed. A substrate comprising a patterned plated layer and a patterned copper layer obtained by peeling the masked tape therefrom and washing with pure water two times was set as a conductive laminate E1-13.

Comparative Example 2

The surface of the patterned copper layer of the conductive laminate E1-13 obtained in Comparative Example 1 was subjected to a blackening treatment using a blackening treatment solution SILL BRIGHT (manufactured by Japan Carlit Co., Ltd.), thereby obtaining a conductive laminate E1-14.

Comparative Example 3

A film made of copper with a thickness of 1 μm was formed on a glass substrate GORILLA GLASS (manufactured by Corning Inc.) using a sputtering device (manufactured by ULVAC Technologies, Inc.). Thereafter, a patterned copper layer was formed according to a photolithography method, thereby obtaining a conductive laminate E1-15 comprising a patterned copper layer.

Comparative Examples 4 to 6

After 200 mL of 10% hydrochloric acid was added to palladium chloride (0.5 g) so that the palladium chloride was dissolved therein, 700 mL of a 1N sodium hydroxide aqueous solution was added thereto. A catalyst-imparting solution Z obtained by adjusting the pH of the Pd catalyst-imparting solution to 1.8 in 10% hydrochloric acid and a 1N sodium hydroxide aqueous solution and a catalyst-imparting solution W obtained by adjusting the pH of the Pd catalyst-imparting solution to 8.0 were respectively prepared.

A conductive laminate E1-16 was prepared by following the same procedures as the procedures for the method of preparing the conductive laminate E1-1 except that the catalyst-imparting solution Z was used in place of the "Pd catalyst-imparting solution MAT-2 (manufactured by Uyemura CO., LTD.) obtained by diluting only MAT-2A to 5 times". However, when the conductive laminate E1-16 was used, deposition of a metal did not occur and a patterned metal layer was not formed.

Further, a conductive laminate E1-17 was prepared by following the same procedures as the procedures for the method of preparing the conductive laminate E1-1 except that the "MAT-2A of the Pd catalyst-imparting solution MAT-2 (manufactured by Uyemura CO., LTD.)" was used in place of the "Pd catalyst-imparting solution MAT-2 (manufactured by Uyemura CO., LTD.) obtained by diluting only MAT-2A to 5 times". Further, the "MAT-2A of the Pd catalyst-imparting solution MAT-2 (manufactured by Uyemura CO., LTD.)" is an embodiment used without dilution which is different from the cases of Examples 1 to 10, and the pH of the "MAT-2A of the Pd catalyst-imparting solution MAT-2 (manufactured by Uyemura CO., LTD.)" was 2.9.

However, when the conductive laminate E1-17 was used, deposition of a metal did not occur and a patterned metal layer was not formed.

A conductive laminate E1-18 was prepared by following the same procedures as the procedures for the method of preparing the conductive laminate E1-1 except that the catalyst-imparting solution W was used in place of the "Pd catalyst-imparting solution MAT-2 (manufactured by Uyemura CO., LTD.) obtained by diluting only MAT-2A to 5 times". Moreover, when the formed conductive laminate E1-18 was used, since a metal layer was formed on the substantially entire surface of the substrate, a predetermined patterned metal layer was not able to be formed so that the conductive laminate was not able to be used for touch panel applications. Therefore, when the conductive laminate E1-18 was used, various evaluations described below were not performed.

<Energy-Dispersive X-Ray Spectroscopy Measurement>

Figure 4A:
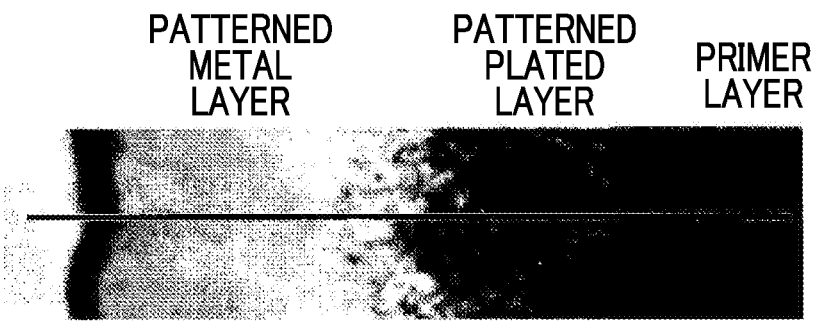
FIG. 4A is a scanning microscopic observation view showing the cross section of the conductive laminate obtained by an example.

The patterned plated layer and the patterned metal layer of the conductive laminate E1-10 were cut along the normal direction of the substrate or the direction vertical to the direction in which the patterned metal layer was extended and then the cross sections of the patterned metal layer and the patterned metal layer were observed using a scanning microscope (see FIG. 4A). As illustrated in FIG. 4A, the patterned metal layer (electroless plated copper), the patterned plated layer, and the primer layer were observed.

Figure 4B:
FIG. 4B shows results from compositional analysis on copper of the cross section of the conductive laminate according to an energy-dispersive X-ray spectroscopy method.

Subsequently, the cross sections of the patterned plated layer and the patterned metal layer were compositionally analyzed along the depth direction using a transmission electron microscope according to the energy-dispersive X-ray spectroscopy method. FIG. 4B shows the profile of a peak derived from copper. As shown in FIG. 4B, a peak having approximately constant intensity is calculated since the patterned metal layer is formed of copper in the patterned metal layer region. Further, in the patterned plated layer region, a peak derived from the same component included in the patterned plated layer is observed. The average peak intensity Pa derived from copper constituting the patterned metal layer and the average peak intensity Pb derived from a copper component contained in the patterned plated layer were calculated according to the above-described method, and then the ratio (Pb/Pa) was acquired. The results thereof are listed in Table 2.

Figure 4C:
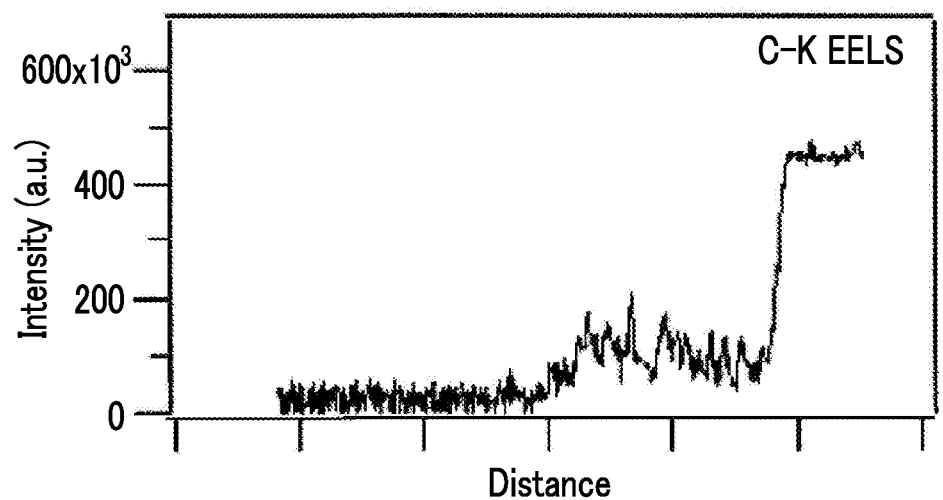
FIG. 4C shows results from compositional analysis on carbon of the cross section of the conductive laminate according to the electron energy loss spectroscopy method.

In addition, FIG. 4C shows results obtained by observing the cross sections of the patterned plated layer and the patterned metal layer according to the electron energy loss spectroscopy method (EELS method). According to the EELS method, it was confirmed that carbon atoms were present and the carbon atoms remained on the patterned plated layer and the primer layer as shown in FIG. 4C.

Hereinbefore, the method of using the conductive laminate E1-10 has been described in detail, and the ratio (Pb/Pa) was acquired by performing the same measurement on the conductive laminates E1-1 to E1-9 and E1-11 to E1-17. Each example and each comparative example were evaluated based on the following evaluation standard. The results are collectively listed in Table 2.

"A": The ratio (Pb/Pa) was in a range of 0.8 to 0.95
"B": The ratio (Pb/Pa) was 0.65 or greater and less than 0.8
"C": The ratio (Pb/Pa) was 0.5 or greater and less than 0.65
"D": The ratio (Pb/Pa) was less than 0.5

<Evaluation>

(Color Evaluation)

The color of the patterned metal layer (patterned copper layer) was evaluated based on the following evaluation standard when the obtained conductive laminate was visually observed from the substrate side. Further, "3" is practically preferable.

"1": The patterned metal layer clearly is visually recognized to have a copper color (orange)
"2": The patterned metal layer slightly is visually recognized to have a copper color (orange)
"3": The patterned metal layer clearly is visually recognized to have blackness.

Further, in a case where the evaluation of the ratio (Pb/Pa) was "A" in the evaluation "3", the black was deep black without luster.

(Evaluation of Conductivity)

Conductive laminates E3-1 to E3-17 for evaluating conductivity were prepared by following the same procedures as the procedures the above-described examples and comparative examples except that a predetermined photomask was used so that the shape of the patterned metal layer to be formed was a mesh shape (length of the metal portion of 2 μm and the length of the opening portion of 98 μm).

The resistance of metal layers was measured by LORESTA MCP-T610 (Mitsubishi Chemical Analytech Co., Ltd.) using the obtained conductive laminates E3-1 to E3-17 for evaluating conductivity and evaluated based on the following evaluation criteria. In addition, "2" is practically preferable.

"1": The resistance value is 1Ω/□ or greater
"2": The resistance value is less than 1 Ω/□

(Cross Section Observation)

The conductive laminates (E1-1 to E1-17) respectively having an area of 1 cm² (1 cm×1 cm) were fixed to an acrylic block and put into a dedicated mold, ACRYLIC RESIN ACRYLIC ONE (MARUTO INSTRUMENT CO., LTD.) was poured to the mold, and the acrylic resin was exposed to light using an exposure device ONE LIGHT (MARUTO INSTRUMENT CO., LTD.) and then cured. The resin was cured and then washed with acetone, the substrate was polished with polishing paper of #400 using a polishing device ML-160A (MARUTO INSTRUMENT CO., LTD.) until the surface thereof appeared, and the surface thereof was polished until the surface became a mirror surface using Baikaloy1.0CR (BAIKOWSK INTERNATIONAL CORPORATION). Thereafter, gold for preventing charge-up was vapor-deposited on the surface thereof, the cross section (surface vertical to the surface of the substrate) of the conductive laminate was observed using Hitachi High-Technologies S-3000, and the average particle diameter was calculated from the light and shade of the image using image analysis software "winRFFO" to confirmed whether the following Requirement A or Requirement B was satisfied. In a case where any one of the following Requirement A and Requirement B was satisfied, it was assumed that a fine structure was "present". Further, in a case where both of the following Requirement A and Requirement B were not satisfied, it was assumed that a fine structure was "absent".

Requirement A: Metal particles having an average particle diameter of 10 to 1000 nm are present on a surface layer region over 500 nm in a direction from the interface between the plated layer (or the patterned plated layer) and the patterned metal layer to the plated layer (or the patterned plated layer) side.

Requirement B: The interface between the plated layer (or the patterned plated layer) and the patterned metal layer has an uneven shape, the arithmetic average roughness Ra of the uneven shape is in a range of 5 to 1000 nm, and the average distance between concave portions in the uneven shape is in a range of 10 to 1000 nm.

In the following Table 2, "L/S (μm/μm)" indicates L (line)/S (space) of the formed patterned metal layer.

In addition, in the columns of "method of forming metal layer", "electroless" indicates that the electroless plating treatment was performed and "sputtering" indicates that a metal layer was formed by sputtering.

Moreover, as described above, a metal layer was deposited on the substantially entire surface in Comparative Example 6 and, accordingly, various evaluations were not performed because the conductive laminate was not able to be used for touch panel applications.

TABLE 2

| | Type of conductive laminate | Type of composition for forming plated layer | Type of substrate | Presence or absence of primer layer | L/S (μm/μm) | pH of catalyst-imparting solution |
|---|---|---|---|---|---|---|
| Example 1 | E1-1 | Composition 1 | Glass | Present | 2/98 | 3.5 |
| Example 2 | E1-2 | Composition 2 | Glass | Present | 2/98 | 3.5 |
| Example 3 | E1-3 | Composition 3 | Glass | Present | 2/98 | 3.5 |
| Example 4 | E1-4 | Composition 4 | Glass | Present | 2/98 | 3.5 |
| Example 5 | E1-5 | Composition 5 | Glass | Present | 2/98 | 3.5 |
| Example 6 | E1-6 | Composition 6 | Glass | Present | 2/98 | 3.5 |
| Example 7 | E1-7 | Composition 1 | Glass | Present | 5/95 | 3.5 |
| Example 8 | E1-8 | Composition 1 | Glass | Present | 10/90 | 3.5 |
| Example 9 | E1-9 | Composition 1 | Glass | Absent | 2/98 | 3.5 |
| Example 10 | E1-10 | Composition 1 | PET | Present | 2/98 | 3.5 |
| Example 11 | E1-11 | Composition 1 | Glass | Present | 2/98 | 4.4 |
| Example 12 | E1-12 | Composition 1 | Glass | Present | 2/98 | 6.6 |
| Comparative Example 1 | E1-13 | Composition of JP1999-170421A (JP-H11-170421A) | Glass | Present | 10/90 | — |
| Comparative Example 2 | E1-14 | Composition of JP1999-170421A (JP-H11-170421A) | Glass | Present | 10/90 | — |
| Comparative Example 3 | E1-15 | — | Glass | — | 10/90 | — |
| Comparative Example 4 | E1-16 | Composition 1 | Glass | Present | 2/98 | 1.8 |
| Comparative Example 5 | E1-17 | Composition 1 | Glass | Present | 2/98 | 2.9 |
| Comparative Example 6 | E1-18 | Composition 1 | Glass | Present | 2/98 | 8 |

| | Method of forming metal layer | Blackening treatment | Evaluation | | | |
|---|---|---|---|---|---|---|
| | | | Pb/Pa evaluation | Color evaluation | Conductivity evaluation | Fine structure |
| Example 1 | Electroless | Not performed | A | 3 | 2 | Present |
| Example 2 | Electroless | Not performed | C | 3 | 2 | Present |
| Example 3 | Electroless | Not performed | B | 3 | 2 | Present |
| Example 4 | Electroless | Not performed | A | 3 | 2 | Present |
| Example 5 | Electroless | Not performed | A | 3 | 2 | Present |
| Example 6 | Electroless | Not performed | A | 3 | 2 | Present |
| Example 7 | Electroless | Not performed | A | 3 | 2 | Present |
| Example 8 | Electroless | Not performed | A | 3 | 2 | Present |
| Example 9 | Electroless | Not performed | A | 3 | 2 | Present |
| Example 10 | Electroless | Not performed | A | 3 | 2 | Present |
| Example 11 | Electroless | Not performed | A | 3 | 2 | Present |
| Example 12 | Electroless | Not performed | A | 3 | 2 | Present |
| Comparative Example 1 | Electroless | Not performed | D | 1 | 2 | Absent |
| Comparative Example 2 | Electroless | Performed | D | 1 | 2 | Absent |
| Comparative Example 3 | Sputtering | Not performed | — | 1 | 2 | Absent |
| Comparative Example 4 | Electroless | Not performed | Not deposited | — | — | — |
| Comparative Example 5 | Electroless | Not performed | Not deposited | — | — | — |
| Comparative Example 6 | Electroless | Not performed | — | — | — | — |

The total light transmittance (JIS K7361-1) of the conductive laminates E1-1 to E1-17 measured using NDH7000 (manufactured by NIPPON DENSHOKU INDUSTRIES Co., LTD.) was 80% or greater.

Further, the total light transmittance of the conductive laminate E1-18 (JIS K7361-1) was less than 80%.

As listed in Table 2, the conductive laminate of the present invention had the patterned metal layer being recognized to have greater blackness and had excellent conductivity.

Further, in Comparative Examples 1 and 2 in which the compositions of JP1999-170421A (JP-H11-170421A) were used and Comparative Example 3 in which the patterned metal layer was prepared by a sputtering method, the conductivity of the patterned metal layer was excellent, but the patterned metal layer had a tinge of copper color. Therefore, the visibility was degraded. Further, as shown in Comparative Example 2, the color of the patterned metal layer was not black when seen from the substrate side even after the blackening treatment was carried out with respect to the conductive laminate of Comparative Example 1 in which the patterned metal layer was visually recognized to have a copper color when seen from the substrate side.

In addition, as shown in Comparative Examples 4 to 6, in a case where a catalyst-imparting solution having a predetermined pH was not used, a conductive laminate having a desired configuration was not able to be obtained and thus desired effects were not able to be obtained.

Example 13

Preparation of Conductive Laminate E2-1 for Touch Panel

A conductive laminate comprising a patterned copper layer was prepared by following the same procedures as the procedures for the method of preparing the conductive laminate E1-1 except that the mask was replaced by a single-side single-layer type mask for preparing a touch panel having both of a sensor portion and a peripheral wiring, thereby obtaining a conductive laminate E2-1 for a touch panel.

Example 14

Preparation of Conductive Laminate E2-2 for Touch Panel

A conductive laminate comprising a patterned copper layer was prepared by following the same procedures as the procedures for the method of preparing the conductive laminate E1-10 except that the mask was replaced by a double-side type mask for preparing a touch panel having both of a sensor portion and a peripheral wiring, and then a blackening treatment was performed on the surface of the copper using a blackening treatment solution SILL BRIGHT (manufactured by Japan Carlit Co., Ltd.), thereby obtaining a conductive laminate E2-2 for a touch panel.

Example 15

Preparation of Conductive Laminate E2-3 for Touch Panel

A conductive laminate E2-3' comprising a patterned copper layer was prepared by following the same procedures as the procedures for the method of preparing the conductive laminate E1-1 except that the mask was replaced by a mask for preparing a touch panel having only a peripheral wiring portion.

Next, a film made of indium tin oxide (ITO) was formed to have a thickness of 50 nm on the surface on which a copper layer of the conductive laminate E2-3' was formed using a sputtering device. The ITO layer was spin-coated with a photoresist TSMR-8900 (manufactured by Tokyo Chemical Industry Co., Ltd.) to have a thickness of 2 μm. The layer was pre-baked at 90° C. for 10 minutes and irradiated with of UV-rays at 40 mJ using a mask for preparing a touch panel having a sensor portion. Thereafter, the layer was post-baked at 110° C. for 10 minutes and the photoresist was patterned using a 0.75% NaOH aqueous solution. Next, the ITO layer was etched using an etching solution ITO-02 (manufactured by Kanto Chemical Co., Inc.). Finally, the photoresist was entirely removed using a 2% NaOH aqueous solution, and then the resultant was washed and dried at 150° C. for 30 minutes, thereby obtaining a conductive laminate E2-3 for a touch panel.

The OCA (#8146-4, thickness: 100 μm) (manufactured by 3M Co., Ltd.) prepared above was attached to both surfaces of the conductive laminate obtained in Example 14. The external shape of the obtained laminate was adjusted such that the laminate had the same size as soda lime glass having a thickness of 0.7 mm which is substantially the sensor size, a flexible printed wiring board (FPC) was pressure-bonded to the conductive laminate using ACF (CP906AM-25AC) (manufactured by Sony Chemicals Corporation), and the soda lime glass was attached to the top side, and then a liquid crystal display was attached to the bottom side, thereby producing a touch panel.

Further, flexible printed wiring boards (FPC) were pressure-bonded to the conductive laminates obtained in the above-described Examples 13 and 15 using ACF (CP906AM-25AC) (manufactured by Sony Chemicals Corporation), and liquid crystal displays were attached thereto, thereby preparing touch panels.

In Table 3, the "single surface" indicates that the sensor portion (sensor electrode) and the peripheral wiring are disposed on only one surface of the substrate and the "both surfaces" indicate that the sensor portion (sensor electrode) and the peripheral wiring are disposed on both surfaces of the substrate.

TABLE 3

| | Type of substrate | Both surfaces/single surface | Material of sensor portion | Material of peripheral wiring |
| --- | --- | --- | --- | --- |
| Example 13 | Glass | Single surface | Copper | Copper |
| Example 14 | PET | Both surfaces | Copper | Copper |
| Example 15 | Glass | Single surface | ITO | Copper |

The configurations of the touch panels obtained in Examples 13 to 15 are collectively listed in Table 3.

In a case where the conductive laminates E2-1 to 2-3 for a touch panel are used as touch panel sensors, the patterned metal layer (the sensor portion and/or the peripheral wiring) formed by the above-described treatment is visually recognized to have blackness when seen from the substrate side and the conductive laminates can be used as touch panel sensors.

EXPLANATION OF REFERENCES

100: conductive laminate for touch panel
12: substrate
22: patterned metal layer
20: patterned plated layer
30: coated film
40: primer layer

What is claimed is:

1. A conductive laminate for a touch panel comprising:
a substrate which has two main surfaces;
a patterned plated layer which is disposed on at least one main surface of the substrate and has a functional group that interacts with metal ions; and
a patterned metal layer which is disposed on the patterned plated layer,
wherein the patterned plated layer includes a metal component constituting the patterned metal layer,
the ratio of the average peak intensity resulting from the metal component contained in the patterned plated layer to the average peak intensity resulting from the metal component constituting the patterned metal layer is in a range of 0.5 to 0.95 when the cross sections of the patterned plated layer and the patterned metal layer are compositionally analyzed using an energy-dispersive X-ray spectroscopy method, and
wherein a primer layer is disposed adjacent to the main surface of the substrate.

2. The conductive laminate for a touch panel according to claim 1,
wherein the patterned plated layer and the patterned metal layer are disposed on each of the two main surfaces of the substrate.

3. The conductive laminate for a touch panel according to claim 2,
wherein the substrate is a glass substrate or a resin substrate.

4. The conductive laminate for a touch panel according to claim 2,
wherein the patterned metal layer contains copper.

5. The conductive laminate for a touch panel according to claim 1,
wherein the substrate is a glass substrate or a resin substrate.

6. The conductive laminate for a touch panel according to claim 5,
wherein the patterned metal layer contains copper.

7. The conductive laminate for a touch panel according to claim 1,
wherein the patterned metal layer contains copper.

8. A touch panel comprising:
the conductive laminate for a touch panel according to claim 1.

9. A touch panel comprising:
the conductive laminate for a touch panel according to claim 2.

10. A touch panel comprising:
the conductive laminate for a touch panel according to claim 5.

11. A transparent conductive laminate comprising:
a substrate which has two main surfaces;
a patterned plated layer which is disposed on at least one main surface of the substrate and has a functional group that interacts with metal ions; and
a patterned metal layer which is disposed on the patterned plated layer,
wherein the patterned plated layer includes a metal component constituting the patterned metal layer,
a ratio of the average peak intensity resulting from the metal component contained in the patterned plated layer to the average peak intensity resulting from the metal component constituting the patterned metal layer is in a range of 0.50 to 0.95 when the cross sections of the patterned plated layer and the patterned metal layer are compositionally analyzed using an energy-dispersive X-ray spectroscopy method, and
wherein a primer layer is disposed adjacent to the main surface of the substrate.

12. A conductive laminate for a touch panel comprising:
a substrate which has two main surfaces;
a patterned plated layer which is disposed on at least one main surface of the substrate and has a functional group that interacts with metal ions; and
a patterned metal layer which is disposed on the patterned plated layer,
wherein the patterned plated layer includes a metal component constituting the patterned metal layer,
the ratio of the average peak intensity resulting from the metal component contained in the patterned plated layer to the average peak intensity resulting from the metal component constituting the patterned metal layer is in a range of 0.5 to 0.95 when the cross sections of the patterned plated layer and the patterned metal layer are compositionally analyzed using an energy-dispersive X-ray spectroscopy method, and
wherein the patterned plated layer is a layer formed with a composition for forming a plated layer which contains: a compound having a functional group interacting with metal ions and a polymerizable group; and a polyfunctional monomer.

* * * * *